United States Patent
Isobe et al.

(10) Patent No.: US 8,335,426 B2
(45) Date of Patent: Dec. 18, 2012

(54) RECORDING APPARATUS, RECORDING METHOD, AND RECORDING PROGRAM, AND IMAGE CAPTURING APPARATUS, IMAGE CAPTURING METHOD, AND IMAGE CAPTURING PROGRAM

(75) Inventors: Yukio Isobe, Kanagawa (JP); Kenichiro Aridome, Kanagawa (JP); Naoki Morimoto, Tokyo (JP); Atsushi Mae, Kanagawa (JP); Tetsuhiro Maeda, Kanagawa (JP)

(73) Assignee: Sony Corporation (JP)

( * ) Notice: Subject to any disclaimer, the term of this patent is extended or adjusted under 35 U.S.C. 154(b) by 1309 days.

(21) Appl. No.: 11/992,362

(22) PCT Filed: Jul. 25, 2007

(86) PCT No.: PCT/JP2007/065030
§ 371 (c)(1),
(2), (4) Date: Mar. 19, 2008

(87) PCT Pub. No.: WO2008/013308
PCT Pub. Date: Jan. 31, 2008

(65) Prior Publication Data
US 2009/0238539 A1    Sep. 24, 2009

(30) Foreign Application Priority Data
Jul. 26, 2006    (JP) .............................. P2006-203037

(51) Int. Cl.
*H04N 5/92* (2006.01)
(52) U.S. Cl. ..................................................... 386/337
(58) Field of Classification Search .................. 386/337
See application file for complete search history.

(56) References Cited

U.S. PATENT DOCUMENTS

| | | | | |
|---|---|---|---|---|
| 4,725,897 | A * | 2/1988 | Konishi | 386/326 |
| 7,162,144 | B1 * | 1/2007 | Ono et al. | 386/278 |
| 2002/0018644 | A1 * | 2/2002 | Isobe et al. | 386/95 |
| 2005/0175321 | A1 | 8/2005 | Aridome et al. | |
| 2005/0226599 | A1 | 10/2005 | Bernsen et al. | |
| 2006/0279628 | A1 * | 12/2006 | Fleming | 348/143 |

FOREIGN PATENT DOCUMENTS

| | | | |
|---|---|---|---|
| JP | 07-023329 | A | 1/1995 |
| JP | 2004-350251 | A | 12/2004 |
| JP | 2005-524191 | A | 8/2005 |
| WO | WO-2006/033279 | A1 | 3/2006 |

\* cited by examiner

*Primary Examiner* — Jeffrey D Popham
(74) *Attorney, Agent, or Firm* — Lerner, David, Littenberg, Krumholz & Mentlik, LLP

(57) ABSTRACT

To allow AV data created after the start of recording until the end of recoding to be easily continuously recorded and reproduced for a long time as a file. A stream of which AV data have been multiplexed is recorded to a file in the unit of a packet. When the file size exceeds 2 GB with the next packet that is recorded, record control is performed such that the time of the last end of audio data of the current file matches the time of the beginning of audio data of the next file to which the stream is recorded, the current file is closed, and seamless connection that denotes that the closed file and the next file to which the stream is recorded are connected such that audio data do not overlap is set. A file is newly created and the stream is continuously recorded thereto. The recording of the file is stopped according to a stop operation. When the recording is performed for a long time, a file is automatically divided. Upon reproducing, files in which the stream has been recorded for a long time can be continuously reproduced without causing the user to recognize the division of the file.

16 Claims, 36 Drawing Sheets

Fig. 6

| SYNTAX | DATA LENGTH (BITS) | MNEMONIC |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

Fig. 7

| SYNTAX | DATA LENGTH (BITS) | MNEMONIC |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (title_id=0; title_id < NumberOfTitles; title_id++) { | | |
|         MovieTitle[title_id]() { | | |
|             reserved | 1 | bslbf |
|             '1' | 1 | bslbf |
|             reserved | 46 | bslbf |
|             MovieTitleMobjIDRef[title_id] | 16 | uimsbf |
|             reserved | 32 | bslbf |
|         } | | |
|     } | | |
| } | | |

Fig. 8

| SYNTAX | DATA LENGTH (BITS) | MNEMONIC |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

Fig. 9

| SYNTAX | DATA LENGTH (BTS) | MNEMONIC |
|---|---|---|
| blkMovieObjects() { | | |
|   Length | 32 | uimsbf |
|   reserved | 32 | bslbf |
|   NumberOfMobjs | 16 | uimsbf |
|   for (mobj_id=0; mobj_id<NumberOfMobjs; mobj_id++) { | | |
|     MovieObject[mobj_id]() { | | |
|       TerminalInfo() { | | |
|         '1' | 1 | bslbf |
|         reserved | 15 | bslbf |
|       } | | |
|       NumberOfNavigationCommands[mobj_id] | 16 | uimsbf |
|       for (command_id=0; command_id<NumberOfNavigationCommands[mobj_id]; command_id++){ | | |
|         NavigationCommand[mobj_id][command_id] | 96 | bslbf |
|       } | | |
|     } | | |
|   } | | |
| } | | |

Fig. 10

| SYNTAX | DATA LENGTH (BITS) | MNEMONIC |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

*Fig. 11*

| SYNTAX | DATA LENGTH (BITS) | MNEMONIC |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(PlayItem_id=0; PlayItem_id<NumberOfPlayItems; PlayItem_id++) { | | |
|         blkPlayItem() | | |
|     } | | |
|     for(SubPath_id=0; SubPath_id<NumberOfSubPaths; SubPath_id++) { | | |
|         blkSubPath() | | |
|     } | | |
| } | | |

Fig. 12

| SYNTAX | DATA LENGTH (BITS) | MNEMONIC |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

*Fig. 14*

| SYNTAX | DATA LENGTH (BITS) | MNEMONIC |
|---|---|---|
| blkPlayListMark() { | | |
|     Length | 32 | uimsbf |
|     NumberOfPlayListMarks | 16 | uimsbf |
|     for(PL_mark_id=0;<br>        PL_mark_id< NumberOfPlayListMarks;<br>        PL_mark_id++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

Fig. 15

| SYNTAX | DATA LENGTH (BITS) | MNEMONIC |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

Fig. 16

| SYNTAX | DATA LENGTH (BITS) | MNEMONIC |
|---|---|---|
| blkClipInfo() { | | |
|     Length | 32 | uimsbf |
|     reserved | 16 | bslbf |
|     ClipStreamType | 8 | bslbf |
|     ApplicationType | 8 | bslbf |
|     reserved | 31 | bslbf |
|     IsCC5 | 1 | bslbf |
|     TSRecordingRate | 32 | uimsbf |
|     NumberOfSourcePackets | 32 | uimsbf |
|     reserved | 1024 | bslbf |
|     TSTypeInfoBlock() | | |
|     if (IsCC5 ==1$_b$) { | | |
|         reserved | 8 | bslbf |
|         FollowingClipStreamType | 8 | bslbf |
|         reserved | 32 | bslbf |
|         FollowingClipInformationFileName | 8 * 5 | bslbf |
|         ClipCodecIdentifier | 8 * 4 | bslbf |
|         reserved | 8 | bslbf |
|     } | | |
| } | | |

Fig. 17

| SYNTAX | DATA LENGTH (BITS) | MNEMONIC |
|---|---|---|
| blkSequenceInfo() { | | |
|     Length | 32 | uimsbf |
|     reserved | 15 | bslbf |
|     '1' | 1 | bslbf |
|     SPNATCStart | 32 | uimsbf |
|     NumberOfSTCSequences | 8 | uimsbf |
|     reserved | 8 | uimsbf |
|     for (stc_id=0; stc_id<NumberOfSTCSequences; stc_id++) { | | |
|         PCRPID[stc_id] | 16 | uimsbf |
|         SPNSTCStart[stc_id] | 32 | uimsbf |
|         PresentationStartTime[stc_id] | 32 | uimsbf |
|         PresentationEndTime[stc_id] | 32 | uimsbf |
|     } | | |
| } | | |

Fig. 18

| SYNTAX | DATA LENGTH (BITS) | MNEMONIC |
|---|---|---|
| blkProgramInfo() { | | |
| Length | 32 | uimsbf |
| reserved | 15 | bslbf |
| '1' | 1 | bslbf |
| SPNProgramSequenceStart | 32 | uimsbf |
| ProgramMapPID | 16 | uimsbf |
| NumberOfStreamsInPS | 8 | uimsbf |
| reserved | 8 | bslbf |
| for (stream_index=0; stream_index<NumberOfStreamsInPS; stream_index++) { | | |
|     StreamPID[stream_index] | 16 | uimsbf |
|     blkStreamCodingInfo( stream_index) | | |
| } | | |
| } | | |

*Fig. 19*

| SYNTAX | DATA LENGTH (BITS) | MNEMONIC |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

Fig. 20

| SYNTAX | DATA LENGTH (BITS) | MNEMONIC |
|---|---|---|
| blkEPMap(){ | | |
| reserved | 8 | bslbf |
| NumberOfStreamPIDEntries | 8 | uimsbf |
| for (k=0; k<NumberOfStreamPIDEntries; k++) { | | |
| StreamPID[k] | 16 | bslbf |
| reserved | 10 | bslbf |
| EPStreamType[k] | 4 | bslbf |
| NumberOfEPCoarseEntries[k] | 16 | uimsbf |
| NumberOfEPFineEntries[k] | 18 | uimsbf |
| EPMapForOneStreamPIDStartAddress[k] | 32 | uimsbf |
| } | | |
| for (i=0; i<X; i++) { | | |
| padding_word | 16 | bslbf |
| } | | |
| for (k=0; k<NumberOfStreamPIDEntries; k++) { | | |
| blkEPMapForOneStreamPID(EPStreamType[k], NumberOfEPCoarseEntries[k], NumberOfEPFineEntries[k]) | | |
| for (i=0; i<Y[k]; i++) { | | |
| padding_word | 16 | bslbf |
| } | | |
| } | | |
| } | | |

Fig. 21

| SYNTAX | DATA LENGTH (BITS) | MNEMONIC |
|---|---|---|
| blkEPMapForOneStreamPID(*EP_stream_type, Nc, Nf*) { | | |
|     EPFineTableStartAddress | 32 | uimsbf |
|     for (i=0; i<*Nc*; i++) { | | |
|     // EP coarse table | | |
|         RefToEPFineID*[i]* | 18 | uimsbf |
|         PTSEPCoarse*[i]* | 14 | uimsbf |
|         SPNEPCoarse*[i]* | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*, *EP_fine_id*++) { | | |
|     // EP fine table | | |
|         ReservedEPFine*[EP_fine_id]* | 1 | bslbf |
|         IEndPositionOffset*[EP_fine_id]* | 3 | bslbf |
|         PTSEPFine*[EP_fine_id]* | 11 | uimsbf |
|         SPNEPFine*[EP_fine_id]* | 17 | uimsbf |
|     } | | |
| } | | |

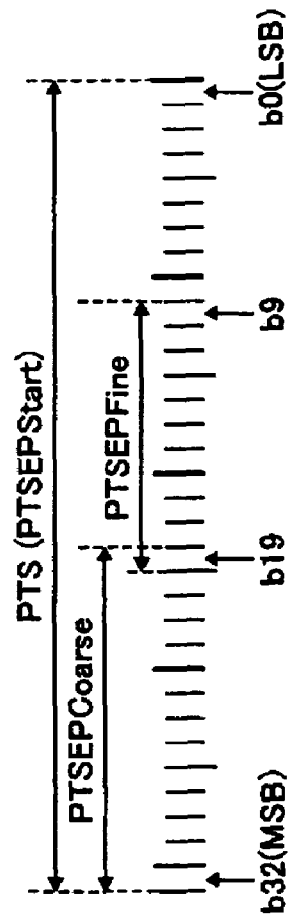

*Fig. 24*

| SYNTAX | DATA LENGTH (BITS) | MNEMONIC |
|---|---|---|
| blkExtensionData() { | | |
|   Length | 32 | uimsbf |
|   if(Length !=0){ | | |
|     DataBlockStartAddress | 32 | uimsbf |
|     reserved | 24 | |
|     NumberOfExtDataEntries | 8 | uimsbf |
|     for (i=0; i<NumberOfExtDataEntries; i++) { | | |
|       ext_data_entry() { | | |
|         ExtDataType | 16 | uimsbf |
|         ExtDataVersion | 16 | uimsbf |
|         ExtDataStartAddress | 32 | uimsbf |
|         ExtDataLength | 32 | uimsbf |
|       } | | |
|     } | | |
|     for (i=0; i<L1; i++) { | | |
|       padding_word | 16 | bslbf |
|       padding_word | 16 | bslbf |
|     } | | |
|     DataBlock() | 32+ 8 * (Length − DataBlockStartAddress) | |
|   } | | |
| } | | |

Fig. 28

| SYNTAX | DATA LENGTH (BITS) | MNEMONIC |
|---|---|---|
| blkIndexExtensionData(){ | | |
|     TypeIndicator | 8 * 4 | uimsbf |
|     reserved | 8 * 4 | bslbf |
|     TableOfPlayListsStartAddress | 32 | uimsbf |
|     MakersPrivateDataStartAddress | 32 | uimsbf |
|     reserved | 192 | bslbf |
|     blkUIAppInfoAVCHD() | | |
|     for(i=0; i<N1;i++) { | | |
|         padding_word | 16 | bslbf |
|     } | | |
|     blkTableOfPlayLists() | | |
|     for(i=0; i<N2;i++) { | | |
|         padding_word | 16 | bslbf |
|     } | | |
|     blkMakersPrivateData() | | |
|     for (i=0; i<N3;i++){ | | |
|         padding_word | 16 | bslbf |
|     } | | |
| } | | |

Fig. 29

| SYNTAX | DATA LENGTH (BITS) | MNEMONIC |
|---|---|---|
| blkTableOfPlayLists() { | | |
|     Length | 32 | uimsbf |
|     blkFirstPlaybackTitlePlayLists() | | |
|     blkMenuTitlePlayLists() | | |
|     NumberOfTitlePlayListPair | 16 | bslbf |
|     for(i=0; i< NumberOfTitlePlayListPair;i++){ | | |
|         blkMovieTitlePlayListPair() { | | |
|             PlayListFileName | 8 * 5 | bslbf |
|             reserved | 6 | bslbf |
|             PlayListAttribute | 2 | uimsbf |
|             reserved | 16 | bslbf |
|             RefToTitleId | 16 | uimsbf |
|         } | | |
|     } | | |
| } | | |

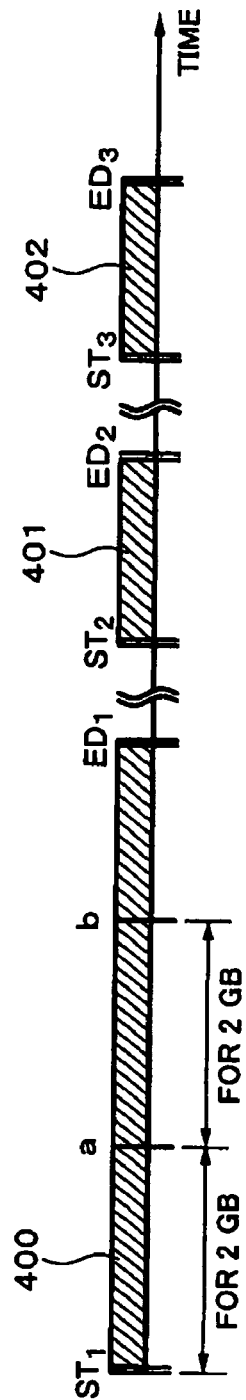
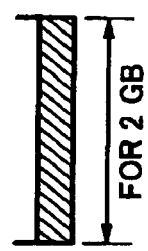
Fig. 35A
Fig. 35B

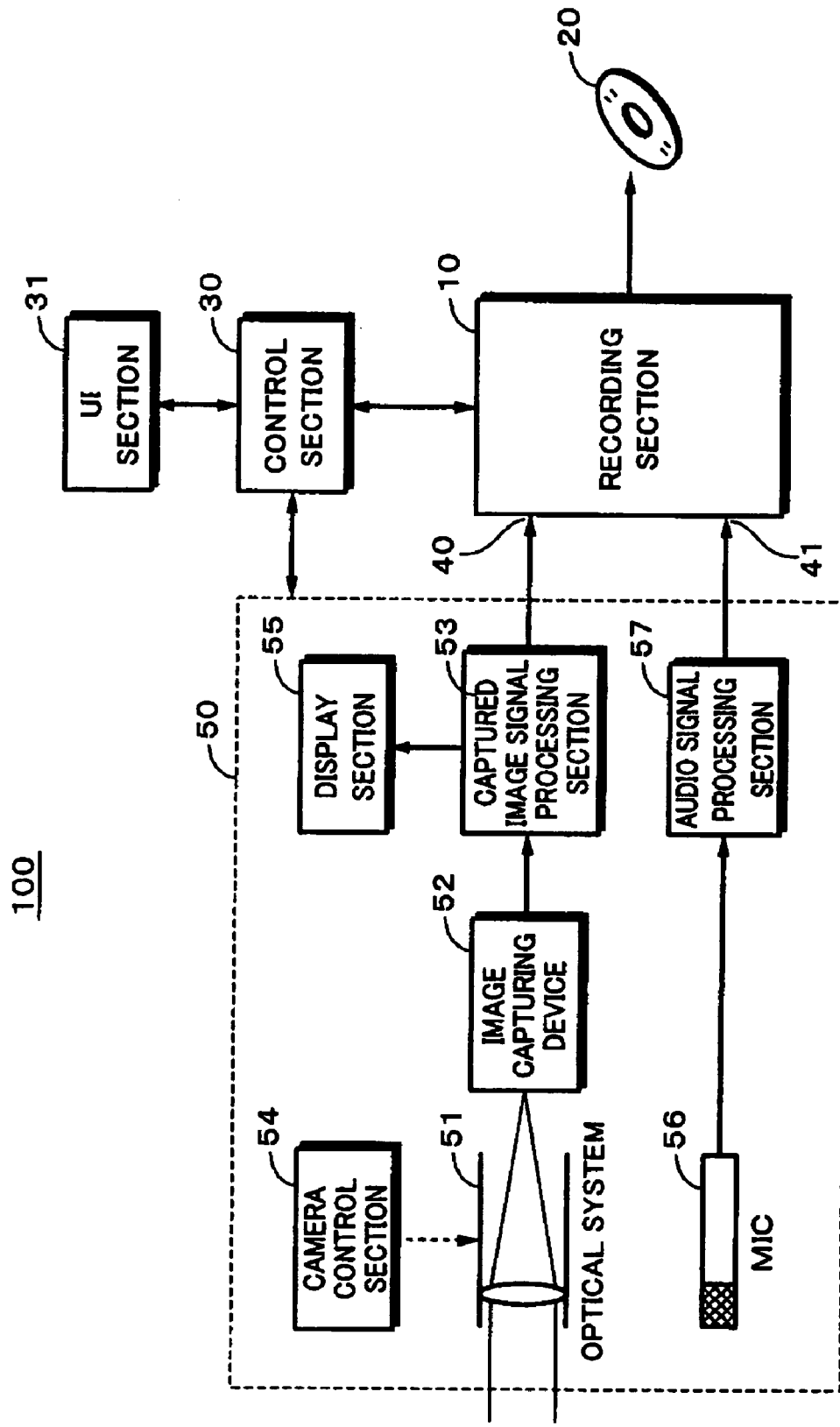

RECORDING APPARATUS, RECORDING METHOD, AND RECORDING PROGRAM, AND IMAGE CAPTURING APPARATUS, IMAGE CAPTURING METHOD, AND IMAGE CAPTURING PROGRAM

CROSS REFERENCE TO RELATED APPLICATIONS

The present application is a national phase entry under 35 U.S.C. §371 of International Application No. PCT/JP2007/065030 filed Jul. 25, 2007, published on Jan. 31, 2008 as WO 2008/013308 A1, which claims priority from Japanese Patent Application No. JP 2006-203037 filed in the Japanese Patent Office on Jul. 26, 2006.

TECHNICAL FIELD

The present invention relates to a recording apparatus, a recording method, and a recording program, and an image capturing apparatus, an image capturing method, and an image capturing program suitable for recording stream data of which video data and audio data have been multiplexed to a record medium.

BACKGROUND ART

Conventionally, for example, in a video camera or the like, a magnetic tape was used as a record medium to which a video signal that was captured by an image capturing device, converted into digital video data, and compression-encoded was recorded. A magnetic tape was suitable for continuously recording a large amount of data.

On the other hand, in recent years, as a record medium that is recordable and removable from a recording and reproducing apparatus, that has a relatively large recording capacity, and that is suitable for recording AV (Audio/Video) data composed of video data and audio data, a DVD (Digital Versatile Disc) that has a recording capacity equal to or larger than 4.7 GB (Giga Byte) has been widely used. Patent Document "Japanese Patent Application Laid-Open No. 2004-350251" describes an image capturing apparatus that records DVD-Video format data to a recordable type DVD.

Since this recordable type DVD uses the UDF (Universal Disk Format) as a file system, a UDF based computer apparatus can access this recordable type DVD. Since the UDF contains the ISO (International Organization for Standardization) 9660 based format, various types of file systems used for computer apparatus can access the recordable type DVD. When video data and audio data are recorded as a file to this recordable type DVD, since its affinity to other apparatus such as computer apparatus increases, recorded data can be more effectively used.

In addition, in recent years, a product of a video camera that has a built-in hard disk drive that records video data and audio data that have been captured as a file has come out. In addition, a product that uses a semiconductor memory having a large capacity has been proposed.

Conventionally, when a magnetic tape was used as a record medium, video data and audio data were recorded to the record medium in the unit of video data created after the record start operation until the record stop operation. Thus, it is preferred that video data and audio data be recorded as a file in the unit of data created after the record start operation until the record stop operation-because its affinity to the conventional recording system increases.

When video data and audio data that are continuously provided are recorded as a file to a record medium, their record time after the record start operation until the record stop operation may be restricted due to the restriction on the system. The restriction on the system may be contemplated to be the restriction of the file size on the file system applied to the record medium, the restriction with respect to management information of a file that stores video data and audio data, and so forth.

Next, the restriction on the file system will be described in brief. When a file recorded on a record medium is handled by a computer apparatus, the format of the file recorded on the record medium is necessary to correspond to the file system of the computer apparatus. When a low level file system used in computer apparatus is considered, files on the record medium can be read by many computer apparatus. For example, the file format on the record medium may be contemplated to have compatibility with the FAT 16 (File Allocation Table 16), which is a file system used in Windows (registered trademark) as one of OSs (Operating Systems) of computer apparatus.

In the FAT 16, the maximum size of one file is restricted to 2 GB (Giga Byte). In contrast, in the UDF, the maximum size of one file is much larger than 2 GB. Thus, if the size of a file recorded on the basis of the UDF standard exceeds 2 GB, this file cannot be handled on the FAT 16.

Thus, when the user uses, for example, a video camera, he or she needs to start and stop recording taking into account of the file system of a computer apparatus that uses digital video data recorded as a file. As a result, there was a problem of which the user-friendliness remarkably deteriorated. In addition, there was a problem of which before data for the recordable time were recorded to the record medium, since recording had to be stopped, the continuous record time corresponding to the record capacity could not be secured.

To solve this problem, it can be contemplated that the system monitors the size of a file that is being recorded, closes the file when the file size reaches a predetermined size, creates a new file, and continues recording with it. In this case, however, upon reproducing, an operation of continuously reproducing a plurality of files created by continuous recording needs to be performed. As a result, there was a problem of which the operation required a burden on the user.

DISCLOSURE OF THE INVENTION

Therefore, an object of the present invention is to provide a recording apparatus, a recording method, a recording program, and an image capturing apparatus, an image capturing method, and an image capturing program that allow video data and audio data created after recording is started until it is stopped as file to be easily continuously recorded and reproduced.

To solve the foregoing problem, a first aspect of the present invention is in a recording apparatus which multiplexes video data and audio data and records the resultant data to a record medium, characterized in that the recording apparatus comprises a data input section in which video data and audio data are input; a record command input section in which a record start command and a record stop command for the video data and the audio data are input; a recording section which multiplexes the video data and the audio data in a unit of a packet and successively records a multiplexed stream to a stream file on the record medium in the unit of the packet; a management information creating section which creates a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control section which controls the recording section and the management information creating section, the control section controls the recording section to start and stop recording of the stream to the stream file according to the record start command and the record stop command to the record command input section, and when information which represents an attribute of the stream file does not satisfy a predetermined restriction with a predetermined unit composed of one or a plurality of the packets recorded to the stream file, the control section controls the recording section to close the stream file, newly create the stream file, and successively record the stream to the new stream file starting from the predetermined unit.

In addition, a second aspect of the present invention is in a recording method of multiplexing video data and audio data and recording the resultant data to a record medium, characterized in that the recording method comprises a record command input step at which a record start command and a record stop command for the video data and the audio data that have been input from a data input; a recording step of multiplexing the video data and the audio data in a unit of a packet and successively recording a multiplexed stream to a stream file on the record medium in the unit of the packet; a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command to the record command input step, and when information which represents an attribute of the stream file does not satisfy a predetermined restriction with a predetermined unit composed of one or a plurality of the packets recorded to the stream file, the control step is performed by controlling the recording step to close the stream file, newly create the stream file, and successively record the stream to the new stream file starting from the predetermined unit.

In addition, a third aspect of the present invention is in a recording program which causes a computer apparatus to execute a recording method of multiplexing video data and audio data and recording the resultant data to a record medium, characterized in that the recording method comprises a record command input step at which a record start command and a record stop command for the video data and the audio data that have been input from a data input; a recording step of multiplexing the video data and the audio data in a unit of a packet and successively recording a multiplexed stream to a stream file on the record medium in the unit of the packet; a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command to the record command input step, and when information which represents an attribute of the stream file does not satisfy a predetermined restriction with a predetermined unit composed of one or a plurality of the packets recorded to the stream file, the control step is performed by controlling the recording step to close the stream file, newly create the stream file, and successively record the stream to the new stream file starting from the predetermined unit.

In addition, a fourth aspect of the present invention is in an image capturing apparatus which multiplexes video data of which a subject has been captured and obtained by an image capturing section and audio data of which a sound has been collected and obtained by a sound collecting section and records resultant data to a record medium, characterized in that the image capturing apparatus comprises the image capturing section which captures the subject and outputs the video data; the sound collecting section which collects the sound and outputs the audio data; a recording section which multiplexes the video data and the audio data in a unit of a packet and successively records a multiplexed stream to a stream file on the record medium in the unit of the packet; an operation section which accepts user's operations for a record start command and a record stop command for the video data and the audio data to the record medium; a management information creating section which creates a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control section which controls the recording section and the management information creating section, the control section controls the recording section to start and stop recording of the stream to the stream file according to the record start command and the record stop command by the operations to the record command input section, and when information which represents an attribute of the stream file does not satisfy a predetermined restriction with a predetermined unit composed of one or a plurality of the packets recorded to the stream file, the control section controls the recording section to close the stream file, newly create the stream file, and successively record the stream to the new stream file starting from the predetermined unit.

In addition, a fifth aspect of the present invention is in an image capturing method of multiplexing video data of which a subject has been captured and obtained by an image capturing section and audio data of which a sound has been collected and obtained by a sound collecting section and recording resultant data to a record medium, characterized in that the image capturing method comprises a recording step of multiplexing the video data of which the subject has been captured and obtained and the audio data of which the sound has been collected and obtained in a unit of a packet and successively recording a multiplexed stream to a stream file on the record medium in the unit of the packet; a step of accepting user's operations for a record start command and a record stop command against an operation section for the video data and the audio data to the record medium; a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command by the operations to the operation section, and when information which represents an attribute of the stream file does not satisfy a predetermined restriction with a predetermined unit composed of one or a plurality of the packets recorded to the stream file, the control step is performed by controlling the recording step to close the stream file, newly creating the stream file, and successively recording the stream to the new stream file starting from the predetermined unit.

In addition, a sixth aspect of the present invention is in an image capturing program which causes a computer apparatus to execute an image capturing method of multiplexing video data of which a subject has been captured and obtained by an image capturing section and audio data of which a sound has been collected and obtained by a sound collecting section and recording resultant data to a record medium, characterized in that the image capturing method comprises a recording step of multiplexing the video data of which the subject has been captured and obtained and the audio data of which the sound has been collected and obtained in a unit of a packet and successively recording a multiplexed stream to a stream file on the record medium in the unit of the packet; a step of accepting user's operations for a record start command and a record stop command against an operation section for the video data and the audio data to the record medium; a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command by the operations to the operation section, and when information which represents an attribute of the stream file does not satisfy a predetermined restriction with a predetermined unit composed of one or a plurality of the packets recorded to the stream file, the control step is performed by controlling the recording step to close the stream file, newly creating the stream file, and successively recording the stream to the new stream file starting from the predetermined unit.

As described above, according to the first, second, and third aspect of the present invention, video data and audio data that have been input from a data input are multiplexed in a unit of a packet and successively recorded to a stream file on the record medium in the unit of the packet. A stream information file which associates at least reproduction time information of the stream file recorded on the record medium with address information thereof and a reproduction list file which stores at least one record of reproduction region data which represents a reproduction region which is set with a reproduction start point and a reproduction end point of the stream file are created. The reproduction list file is capable of storing mark information which represents reproduction time information of the stream file. The recording is controlled to start and stop recording of the stream to the stream file according to the record start command and the record stop command to the record command input section. When information which represents an attribute of the stream file does not satisfy a predetermined restriction with a predetermined unit composed of one or a plurality of the packets recorded to the stream file, control is performed such that the stream file is closed, the stream file is newly created, and the stream is successively recorded to the new stream file starting from the predetermined unit. Thus, the recording can be continuously performed for a long duration without necessity of recognizing the predetermined restriction to the stream file.

In addition, according to the fourth, fifth, and sixth aspects of the present invention, video data of which a subject has been captured and obtained and audio data of which sound has been collected and obtained are multiplexed in a unit of a packet and successively recorded to a stream file on the record medium in the unit of the packet. A stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file are created. The recording is controlled to start and stop recording of the stream to the stream file according to the record start command and the record stop command by the operations to an operation section. When information which represents an attribute of the stream file does not satisfy a predetermined restriction with a predetermined unit composed of one or a plurality of the packets recorded to the stream file, the recoding is controlled such that the stream file is closed, the stream file is newly created, and the stream is successively recorded to the new stream file starting from the predetermined unit. Thus, the image capturing can be continuously performed for a long duration and video data and audio data that have been captured can be continuously recorded for a long duration without causing the user to recognize the predetermined restriction to the stream file.

As described above, according to the first, second, and third aspect of the present invention, video data and audio data that have been input from a data input are multiplexed in a unit of a packet and successively recorded to a stream file on the record medium in the unit of the packet. A stream information file which associates at least reproduction time information of the stream file recorded on the record medium with address information thereof and a reproduction list file which stores at least one record of reproduction region data which represents a reproduction region which is set with a reproduction start point and a reproduction end point of the stream file are created. The reproduction list file is capable of storing mark information which represents reproduction time information of the stream file. The recording is controlled to start and stop recording of the stream to the stream file according to the record start command and the record stop command to the record command input section. When information which represents an attribute of the stream file does not satisfy a predetermined restriction with a predetermined unit composed of one or a plurality of the packets recorded to the stream file, control is performed such that the stream file is closed, the stream file is newly created, and the stream is successively recorded to the new stream file starting from the predetermined unit. Thus, there is provided an effect of which the recording can be continuously performed for a long duration without necessity of recognizing the predetermined restriction to the stream file.

In addition, according to the fourth, fifth, and sixth aspects of the present invention, video data of which a subject has been captured and obtained and audio data of which sound has been collected and obtained are multiplexed in a unit of a packet and successively recorded to a stream file on the record medium in the unit of the packet. A stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file are created. The recording is controlled to start and stop recording of the stream to the stream file according to the record start command and the record stop command by the operations to an operation section. When information which represents an attribute of the stream file does not satisfy a predetermined restriction with a predetermined unit composed of one or a plurality of the packets recorded to the stream file, the recoding is controlled such that the stream file is closed, the stream file is newly created, and the stream is successively recorded to the new stream file starting from the predetermined unit. Thus, there is provided an effect of which the image capturing can be continuously performed for a long duration and video data and audio data that have been captured can be continuously recorded for a long duration without causing the user to recognize the predetermined restriction to the stream file.

BRIEF DESCRIPTION OF DRAWINGS

FIG. 6 is a schematic diagram showing syntax that represents an example of the structure of a file "index.bdmv";

FIG. 7 is a schematic diagram showing syntax that represents an example of the structure of a block blkIndexes( );

FIG. 8 is a schematic diagram showing syntax that represents an example of the structure of a file "MovieObject.bdmv";

FIG. 9 is a schematic diagram showing syntax that represents an example of the structure of a block blkMovieObjects( );

FIG. 10 is a schematic diagram showing syntax that represents an example of the structure of a play list file "xxxxx.mpls";

FIG. 11 is a schematic diagram showing syntax that represents an example of the structure of a block blkPlayList( );

FIG. 12 is a schematic diagram showing syntax that represents an example of the structure of a block blkPlayItem( );

FIG. 14 is a schematic diagram showing syntax that represents an example of the structure of a block blkPlayListMark( );

FIG. 15 is a schematic diagram showing syntax that represents an example of the structure of a clip information file;

FIG. 16 is a schematic diagram showing syntax that represents an example of the structure of a block blkClipInfo( );

FIG. 17 is a schematic diagram showing syntax that represents an example of the structure of a block blkSequenceInfo( );

FIG. 18 is a schematic diagram showing syntax that represents an example of the structure of a block blkProgramInfo( );

FIG. 19 is a schematic diagram showing syntax that represents an example of the structure of a block blkCPI( );

FIG. 20 is a schematic diagram showing syntax that represents an example of the structure of a block blkEPMap( );

FIG. 21 is a schematic diagram showing syntax that represents an example of the structure of a block blkEPMapForOneStreamPID(EP_stream_type, Nc, Nf);

FIG. 22 is a schematic diagram showing an example of the format of an entry PTSEPCoarse and an entry PTSEPFine;

FIG. 24 is a schematic diagram showing syntax that represents an example of the structure of a block blkExtensionData( );

FIG. 28 is a schematic diagram showing syntax that represents an example of the structure of a block DataBlock( ) of the field blkExtensionData( ) in the file "index.bdmv";

FIG. 29 is a schematic diagram showing syntax that represents an example of the structure of a block blkTableOfPlayList( );

FIG. 35A and FIG. 35B are schematic diagrams for describing an example of an elapse of record time; and FIG. 36 is a block diagram showing an example of the structure of a video camera apparatus according to another embodiment of the present invention.

BEST MODES FOR CARRYING OUT THE INVENTION

Next, with reference to accompanying drawings, an embodiment of the present invention will be described. For easy understanding, an example of a format applicable to the present invention will be described (hereinafter, referred to as the AVCHD format). The AVCHD format is currently being proposed as a record format of which an AV (Audio/Video) stream of which video data and audio data have been multiplexed in a predetermined manner is recorded to a recordable record medium. The AVCHD format allows an AV stream recorded on a record medium to be managed in the unit of one clip with a play list.

A bit stream that has been encoded, for example, according to the ITU-T (International Telecommunication Union-Telecommunication Standardization Sector) recommendation H.264 or the ISO (International Organization for Standardization)/IEC (International Electrotechnical Commission) International Standard 14496-10 (MPEG-4 part 10) Advanced Video Coding (hereinafter, referred to as the H.264|AVC) and that has been multiplexed according to the MPEG2 systems is referred to as a clip AV stream (or an AV stream). A clip AV stream is recorded as a file to a disc by a predetermined file system. This file is referred to as a clip AV stream file (or an AV stream file).

A clip AV stream file is a management unit on a file system. Thus, a clip AV stream file is not always a user-friendly management unit. To facilitate user-friendliness, it is necessary to provide a mechanism of continuously reproducing a plurality of clip AV stream files into which video contents are divided and a mechanism of partly reproducing a clip AV stream file and record information necessary to smoothly perform a special reproduction operation, a cue reproduction operation, and so forth as a database to a disc.

Figure 1:
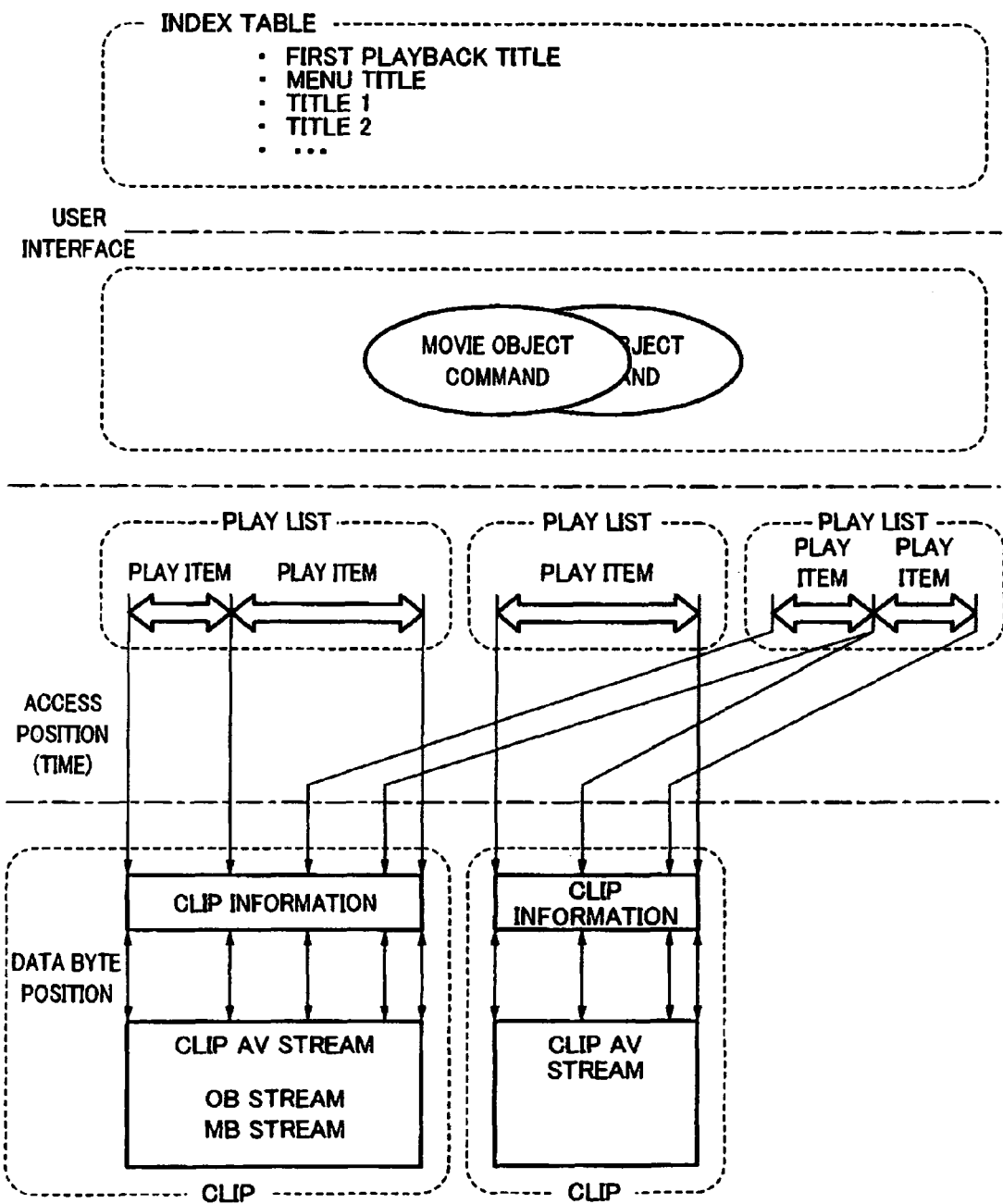
FIG. 1 is a schematic diagram showing an outline of a data model prescribed in the AVCHD format according to the present invention.

FIG. 1 shows an outline of a data model prescribed in the AVCHD format applicable to the present invention. As shown in FIG. 1, the AVCHD format has a data structure with four hierarchical layers. The lowest layer is a layer on which a clip AV stream is placed (for convenience, hereinafter, referred to as the clip layer). Placed above the clip layer is a layer for play lists (PlayList) with which reproduction positions of the clip AV stream are designated and play items (PlayItem) (for convenience, referred to as the play list layer). Placed above the play list layer is a layer for movie objects (Movie Object) each of which is composed of commands that designate the reproduction order of play lists and so forth (for convenience, referred to as the object layer). The highest layer is a layer for an index table with which titles and so forth stored on the record medium are managed (for convenience, referred to as the index layer).

Next, the clip layer will be described. A clip AV stream is a bit stream of which video data and audio data have been multiplexed, for example, according to the MPEG2 TS (transport stream) format. Information about the clip AV stream is recorded as clip information (Clip Information) in a file.

In addition, an OB stream (Overlay Bitmap stream) that is a graphic stream for a subtitle and an MB stream (Menu Bitmap stream) as a stream of data (such as button image data) for a menu indication can be multiplexed with a clip AV stream.

A pair of a clip AV stream file and a clip information file in which clip information corresponding to the clip AV stream file has been recorded is treated as an object and referred to as a clip (Clip). In other words, a clip is one object composed of a clip AV stream and clip information.

A file is generally treated as a sequence of bytes. Contents of a clip AV stream file are mapped on the time base. An entry point of a clip is mainly designated on the time base. When a time stamp of an access point is given to a predetermined clip, a clip information file can be used to find address information with which data are read from the clip AV stream file.

Next, the play list layer will be described. A play list designates an AV stream file to be reproduced. A play list is composed of pairs of a reproduction start point (IN point) and a reproduction end point (OUT point) with which a reproduction position of a designated AV stream file is designated. A pair of the reproduction start point and the reproduction end point is referred to as a play item (PlayItem). A play list is composed of a set of play items. When a play item is reproduced, a part of an AV stream file referred from the play item is reproduced. In other words, a region of a clip is reproduced on the basis of information of an IN point and an OUT point of a play item.

Next, the object layer will be described. A movie object contains a navigation command program and terminal information that is associated with the movie object. The navigation program is a command (navigation command) for controlling the reproduction of a play list.

Next, the index layer will be described. The index layer is composed of an index table (Index Table). The index table is a table in the top level that defines titles of contents recorded on a disc. A module manager of player resident system software controls the reproduction of data of the record medium on the basis of title information stored in the index table.

Figure 2:
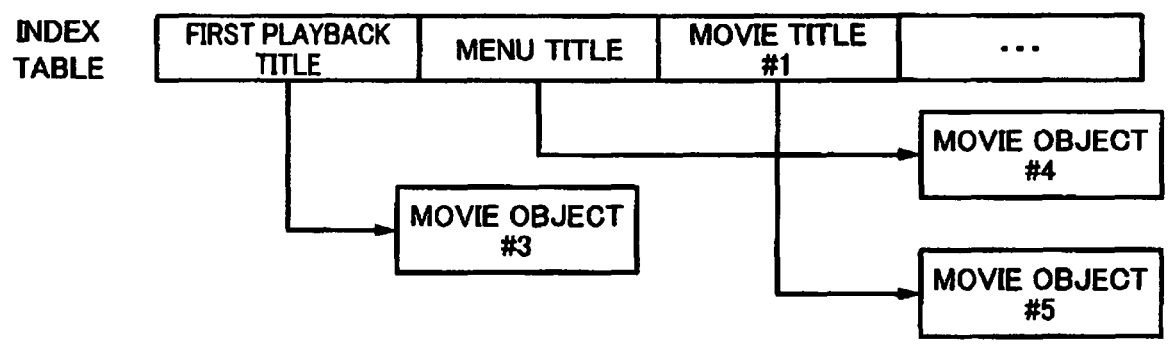
FIG. 2 is a schematic diagram for describing an index table.

In other words, as schematically shown in FIG. 2, any entries in the index table are referred to as titles. All of a first playback title (First PlaybackTitle), a menu title (MenuTitle), and movie title (MovieTitle) #1, #2, and so forth that are entries in the index table are titles. Each title represents a link to a movie object.

For easy understanding, for example, in a reproduction-only record medium, when contents stored in this record medium are a movie, the first playback title corresponds to an advertisement picture of a movie maker, which is followed by the main body of the movie. When contents are a movie, the menu title corresponds to a menu screen with which operations for which the main body is reproduced, a chapter is searched, a subtitle and a language are set, and a bonus picture is reproduced are selected. The movie titles are pictures selected from the menu title. A title may be structured as a menu screen.

Figure 3:
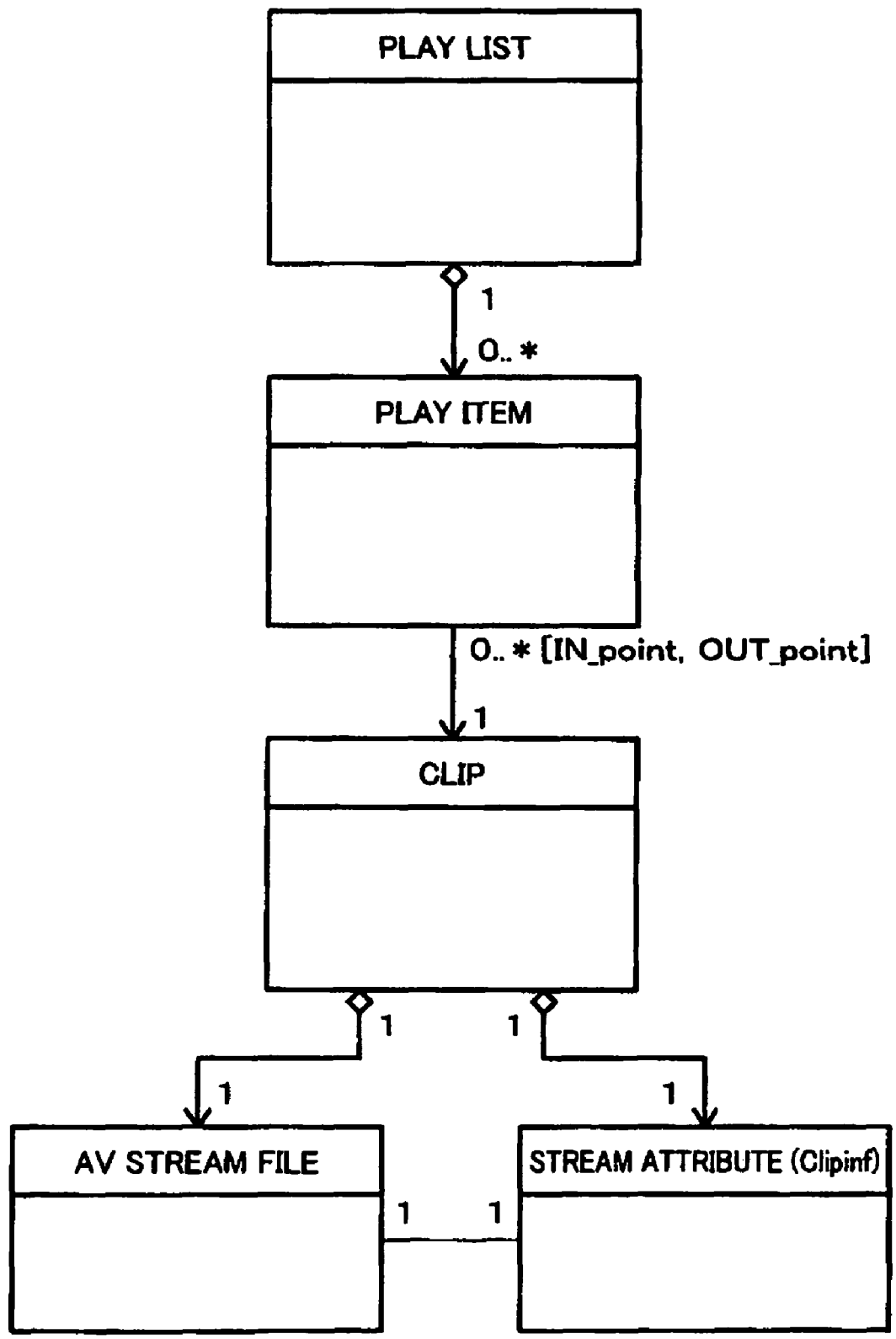
FIG. 3 is an UML diagram showing the relationship of a clip AV stream, clip information, a clip, a play item, and a play list.

FIG. 3 is a UML (Unified Modeling Language) diagram showing the relationship of the foregoing clip AV stream, clip information (Stream Attributes), a clip, a play item, and a play list. A play list is correlated with one or a plurality of play items. A play item is correlated with one clip. One clip can be correlated with a plurality of play items whose start point and/or end point different from each other. One clip refers to one clip AV stream file. Likewise, one clip refers to one clip information file. A clip AV stream file and a clip information file have a relationship of one to one. With such a structure, the reproduction order can be non-destructively designated to reproduce only a desired portion of a clip AV stream file without necessity of changing it.

Figure 4:
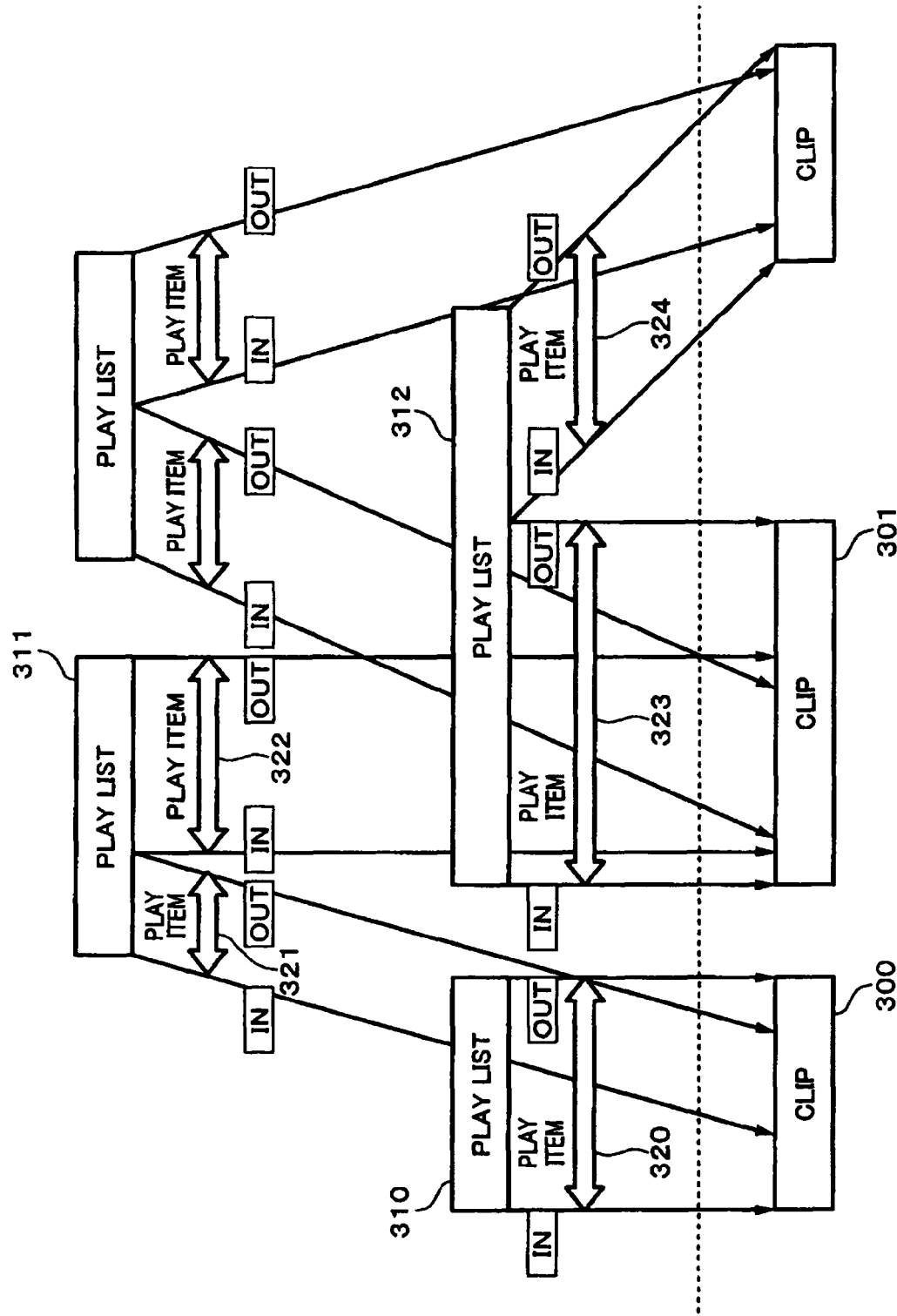
FIG. 4 is a schematic diagram for describing a method of referring to the same clip from a plurality of play lists.

In addition, as shown in FIG. 4, the same clip can be referred from a plurality of play lists. In addition, a plurality of clips can be designated from one play list. A clip is referred with an IN point and an OUT point of a play item in a play list. In the example shown in FIG. 4, a clip 300 is referred from a play item 320 of a play list 310. In addition, the clip 300 is referred for a region designated by an IN point and an OUT point of a play item 321 of a play list 311 that has the play item 321 and a play item 322. In addition, a clip 301 is referred for a region designated by an IN point and an OUT point of the play item 322 of the play list 312. In addition, the clip 301 is referred for a region designated by an IN point and an OUT point of a play item 323 of a play list 312 that has the play item 323 and a play item 324. In the example shown in FIG. 4, the clip 301 is also referred from another play list.

Figure 5:
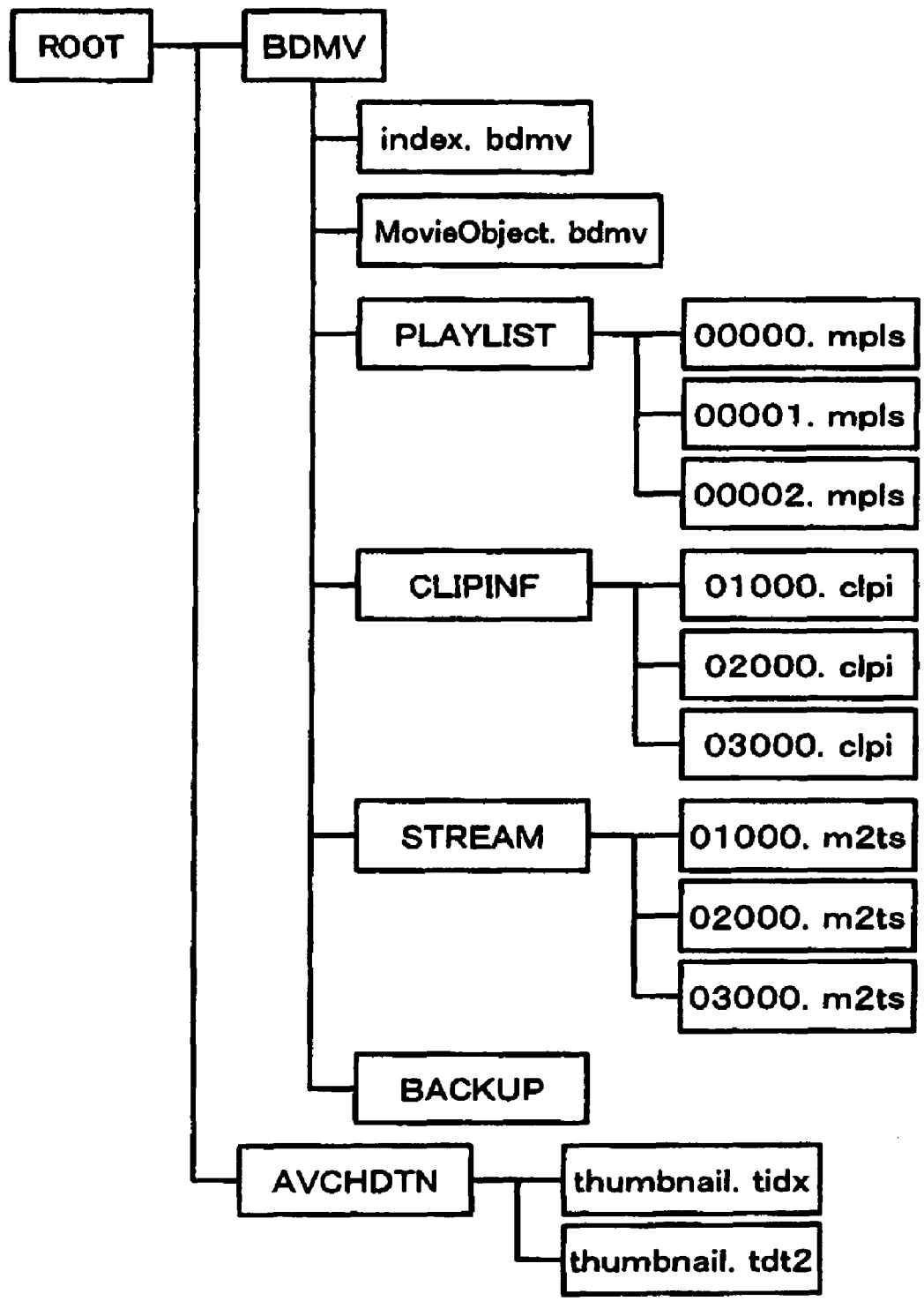
FIG. 5 is a schematic diagram for describing a management structure of files recorded on a record medium.

Next, with reference to FIG. 5, the management structure for files in the AVCHD format on a record medium will be described. Files are hierarchically managed with a directory structure. One directory (in FIG. 5, a root directory) is created on a record medium. Below the directory is the range managed by one recoding and reproducing system.

Placed below the root directory is a directory "BDMV". When necessary, placed below the root direction is a directory "AVCHDTN". Placed in the directory "AVCHDTN" are thumbnail files of which representative images of clips have been reduced in a predetermined size. Placed in the directory "BDMV" is the data structure described with reference to FIG. 1.

Placed immediately below the directory "BDMV" are only two files, a file "index.bdmv" and a file "MovieObject.bdmv". Placed below the directory "BDMV" are a directory "PLAYLIST", a directory "CLIPINF", a directory "STREAM", and a directory "BACKUP". The directory "BACKUP" stores backups of individual directories and files.

The file "index.bdmv" describes the contents of the directory "BDMV". In other words, this file "index.bdmv" corresponds to the index table in the index layer, which is the foregoing highest layer. The file "MovieObject.bdmv" stores information about at least one movie object. In other words, this file "MovieObject.bdmv" corresponds to the foregoing object layer.

The directory "PLAYLIST" is a directory in which the database of play lists is placed. In other words, the directory "PLAYLIST" contains a file "xxxxx.mpls" that is a file with respect to a play list. The file "xxxxx.mpls" is a file created for each play list. In the file name, "xxxxx" followed by a "." (period) is a five-digit numeral. "mpls" preceded by the period is a fixed extension of a file of this type.

The directory "CLIPINF" is a directory in which a database of clips is placed. In other words, the directory "CLIPINF" contains a file "zzzzz.clpi" that is a clip information file corresponding to a clip AV stream file. In the file name, "zzzzz" followed by a "." (period) is a five-digit numeral. "clpi" preceded by the period is a fixed extension of a file of this type.

The directory "STREAM" is a directory in which an AV stream file as an entity is placed. In other words, the directory "STREAM" contains a clip AV stream file corresponding to a clip information file. A clip AV stream file is composed of an MPEG2 (Moving Pictures Experts Group 2) transport stream (hereinafter abbreviated as an MPEG2 TS). The file name of a clip AV stream file is "zzzzz.m2ts". When "zzzzz" followed by the period of the file name of the clip AV stream file is the same as that of the corresponding clip information file, their relationship can be easily recognized.

Two types of thumbnail files thumbnail.tidx and thumbnail.tdt2 can be placed in the directory "AVCHDTN". The thumbnail file thumbnail.tidx stores a thumbnail image that has been encrypted in a predetermined system. In contrast, the thumbnail file thumbnail.tdt2 stores a thumbnail image that has not been encrypted. Since it is likely that a thumbnail image corresponding to a clip that the user has captured, for example, with a video camera is copy-free, this thumbnail image is stored in thumbnail file thumbnail.tdt2.

Next, among files shown in FIG. 5, those that strongly relate to the present invention will be described in more detail. First of all, the file "index.bdmv", which is placed immediately below the directory "BDMV", will be described. FIG. 6 shows syntax that represents an example of the structure of the file "index.bdmv". In this example, syntax is represented according to syntax of the C language, which is used as a programming language for computer devices and so forth. This applies to drawings that show syntax of other files.

In FIG. 6, a field TypeIndicator has a data length of 32 bits and denotes that this file is an index table. A field TypeIndicator2 has a data length of 32 bits and represents the version of the file "index.bdmv". A field "IndexesStartAddress" has a data length of 32 bits and represents the start address of a block blkIndexes( ) in this syntax.

A field ExtensionDataStartAddress has a data length of 32 bits and represents the start address of a block blkExtensionData( ) in this syntax. The block blkExtensionData( ) is a block that can store predetermined extension data. The field ExtensionDataStartAddress represents the start address of the block blkExtensionData( ) as the relative number of bytes from the beginning of bytes of this file "index.bdmv". The relative number of bytes starts with "0". If the value of the field ExtensionDataStartAddress is "0", it denotes that this file "index.bdmv" does not contain the block blkExtensionData( ).

The field ExtensionDataStartAddress is followed by an area reserved that has a data length of 192 bytes. The area reserved is an area reserved for a byte alignment, a future field addition, and so forth. This applies to the description that follows. A block blkAppInfoBDMV( ) is a block in which the contents creator can describe any information and does not affect the operation of the player and so forth.

A block blkIndexes( ) is substantial contents of this file "index.bdmv". The contents described in this block blkIndexes( ) designate the first playback reproduced when the disc is loaded into the player, and a title (a movie object) that is called from the top menu. A play list file (that will be described later) is read according to a command described in a movie object or the like called by an index table.

FIG. 7 shows syntax that represents an example of the structure of the block blkIndexes( ). A field Length has a data length of 32 bits and represents the data length immediately after this field Length until the end of this block blkIndexes( ). The field Length is followed by a block FirstPlaybackTitle( ) and a block MenuTitle( ).

The block FirstPlaybackTitle( ) describes information about an object used in the first playback. The block FirstPlaybackTitle( ) describes an area reserved having a data length of 1 bit, followed by a fixed value "1". The block FirstPlaybackTitle( ) further describes a fixed value "1" through an area reserved having a data length of 31 bits. Followed by an area reserved having a data length of 14 bits, a field FirstPlaybackTitleMobjIDRef having a data length of 16 bits is placed. This field FirstPlaybackTitleMobjIDRef represents the ID of a movie object used in the first playback title.

The ID of a movie object is represented by a value mobj_id used as a loop variable in a for loop statement of a movie object based on syntax of a movie object that will be described later, for example, with reference to FIG. 8 and FIG. 9. In this example, the field FirstPlaybackTitleMobjIDRef stores a value mobj_id corresponding to a movie object to be referred.

The field FirstPlaybackTitleMobjIDRef of the block FirstPlaybackTitle( ) in the block blkIndexes( ) may represent a movie object of the top menu or a title.

The block MenuTitle( ) describes information about an object used in the top menu. The block MenuTitle( ) describes an area reserved having a data length of 1 bits, followed by a fixed value "1". Followed by an area reserved having a data length of 31 bits, a fixed value "1" is described. In addition, followed by an area reserved having a data length of 14 bits, a field MenuTitleMobjIDRef having a data length of 16 bits is placed. The field MenuTitleMobjIDRef represents the ID of a movie object used in the menu title.

The block MenuTitle( ) is followed by a field NumberOfTitles that has a data length of 16 bits and that represents the number of titles that the user can select and that can be reproduced. According to the next for loop statement, the number of times represented by this field NumberOfTitles, a block MovieTitle[title_id]( ) is described with an argument of a value title_id. The block MovieTitle[title_id]( ) describes information of each title. The value title_id is a numeric value from "0" to a value represented by the field NumberOfTitles and identifies a title.

In the block MovieTitle[title_id]( ), followed by an area reserved having a data length of 1 bit, a fixed value "1" is described. In addition, followed by an area reserved having a data length of 46 bits, a field MovieTitleMobjIDRef is described. The field MovieTitleMobjIDRef has a data length of 16 bits and represents the ID of a movie object used in this title. The field MovieTitleMobjIDRef is followed by an area reserved having a data length of 32 bits.

FIG. 8 shows syntax that represents an example of the structure of the file "MovieObject.bdmv" placed immediately below the directory "BDMV". A field type_indicator has a data length of 32 bits (4 bytes) and denotes that this file is the file "MovieObject.bdmv". The field TypeIndicator describes a four-letter character string encoded according to an encoding system prescribed in the ISO (International Organization for Standardization) 646. In the example shown in FIG. 8, the field TypeIndicator describes a four-letter character string "MOBJ" encoded according to a system prescribed in the ISO 646 and denotes that this file is the file "MovieObject.bdmv".

A field TypeIndicator2 has a data length of 32 bits (4 bytes) and represents the version number of this file "MovieObject.bdmv". In this file "MovieObject.bdmv", the field TypeIndicator2 should be four-letter character string "0100" encoded according to an encoding system prescribed in the ISO 646.

A field ExtensionDataStartAddress has a data length of 32 bits and represents the start address of blkExtensionData( ) in this syntax. The field ExtensionDataStartAddress represents the start address of the block blkExtensionData( ) as the relative number of bytes from the beginning of bytes of this file "MovieObject.bdmv". The relative number of bytes starts with "0". If the value of this field ExtensionDataStartAddress is "0", it denotes that the block blkExtensionData( ) does not exist in the file "MovieObject.bdmv".

A field padding_word in syntax shown in FIG. 8 has a data length of 16 bits. According to syntax of this file "MovieObject.bdmv", the field padding_word is inserted the number of times represented by a value N1 or a value N2 into a for loop statement. The value N1 or the value N2 is "0" or any positive integer. As the field padding_word, any value can be used.

Followed by the field ExtensionDataStartAddress, an area reserved having a data length of 224 bits is placed. Thereafter, a block blkMovieObjects( ) that is the main body of this file "MovieObject.bdmv" is stored.

FIG. 9 shows syntax that represents an example of the structure of the block blkMovieObjects( ). A field Length has a data length of 32 bits and represents the data length immediately after this field Length until the end of this block blkMovieObjects( ). Followed by an area reserved having a data length of 32 bits, a field NumberOfMobjs is placed. The field NumberOfMobjs represents the number of movie objects stored according to a for loop statement immediately preceded by the field NumberOfMobjs. A movie object is uniquely identified by a value mobj_id used as a loop variable of the for loop statement. The value mobj_id starts with "0". Movie objects are defined in the order described in the for loop statement.

A block TerminalInfo( ) in the for loop statement describes a fixed value "1", followed by an area reserved having a data length of 15 bits. Thereafter, a field NumberOfNavigationCommands[mobj_id] having a data length of 16 bits is placed. This field NumberOfNavigationCommands[mobj_id] represents the number of navigation commands (NavigationCommand) contained in a movie object MovieObject[mobj_id]( ) represented by a value mobj_id.

According to a for loop statement with a loop variable of value command_id, navigation commands are described for the number represented by a field NumberOfNavigationCommands[mobj_id]. In other words, the field NavigationCommand[mobj_id][command_id] placed in this for loop statement contains navigation commands NavigationCommand's in the order represented by a value command_id contained in a block MovieObject[mobj_id]( ) represented by a value mobj_id. The value command_id starts with "0". The navigation commands NavigationCommand's are defined in the order described in this for loop statement.

FIG. 10 shows syntax that represents an example of the structure of a play list file "xxxxx.mpls". A field TypeIndicator has a data length of 32 bits (4 bytes) and denotes that this file is a play list file. A field TypeIndicator2 has a data length of 32 bits (4 bytes) and represents the version of this play list file. A field PlayListStartAddress has a data length of 32 bits and represents the start address of a block blkPlayList( ) in this syntax.

A field PlayListMarkStartAddress has a data length of 32 bits and represents the start address of a block blkPlayListMark( ) in this syntax. A field ExtensionDataStartAddress has a data length of 32 bits and represents the start address of a block blkExtensionData( ) in this syntax. The field ExtensionDataStartAddress represents the start address of a block blkExtensionData( ) as the relative number of bytes from the beginning of bytes of the file "xxxxx.mpls". The relative number of bytes starts with "0". If the value of the field ExtensionDataStartAddress is 0, it denotes that the block blkExtensionData( ) does not exist in this file "xxxxx.mpls".

Followed by an area reserved having a data length of 160 bits, a block blkAppInfoPlayList( ) is placed. The block blkAppInfoPlayList( ) describes information such as the type and reproduction restrictions of a play list described in the next block blkPlayList( ). The block blkPlayList( ) describes a play list. The block blkPlayListMark( ) describes a point to be jumped as in a chapter jump. The block blkExtensionData( ) is a block that can store predetermined extension data.

A field padding_word in syntax shown in FIG. 10 has a data length of 16 bits. According to syntax of this file "xxxxx.mpls", the field padding_word is inserted the number of times represented by a value N1, a value N2 and a value N3 into a for loop statement. The value N1, the value N2, or the value N3 is "0" or any positive integer. As the field padding_word, any value can be used.

FIG. 11 shows syntax that represents an example of the structure of the block blkPlayList( ). A field Length has a data length of 32 bits and represents the data length immediately after this field Length until the end of the block blkPlay- List( ). The field Length is followed by an area reserved having a data length of 16 bits, followed by a field NumberOfPlayItems. The field NumberOfPlayItems has a data length of 16 bits and represents the number of play items contained in this block blkPlayList( ). A field NumberOfSubPath represents the number of sub paths contained in this block blkPlayList( ).

According to the next for loop statement, blocks blkPlayItem( )'s that describe a play item are described for the number represented by the field NumberOfPlayItems. A count value based on the for loop statement becomes an identifier PlayItem_id of a block blkPlayItem( ). According to the next for loop statement, blocks blkSubPath( )'s are described for the number represented by the field NumberOfSubPath. A count value based on the for loop statement becomes an identifier SubPath_id of a block blkSubPath( ).

A sub path can be provided corresponding to a sub play item while a main path is provided corresponding to a play item that is mainly reproduced. A sub path can be used to designate for example audio data for after-recording, and a sub image to be reproduced in synchronization with a clip designated in a play item.

FIG. 12 shows syntax that represents an example of the structure of a block blkPlayItem( ). A field Length has a data length of 16 bits and represents the data length immediately after this field Length until the end of the block blkPlayItem( ).

A field ClipInformationFileName has a data length of 40 bits (5 bytes) and represents the file name of a clip information file to which this block blkPlayItem( ) refers. In this play item, a clip information file having a filename represented by the field ClipInformationFileName is read. A field ClipCodecIdentifier[0] has a data length of 32 bits (4 bytes) and represents the codec system of a clip AV stream used in this play item in this block blkPlayItem( ).

Followed by an area reserved having a data length of 12 bits, a field ConnectionCondition is placed. The field ConnectionCondition has a data length of 4 bits and represents information about a connection state of clips. For recordable record mediums, as the value of the field ConnectionCondition, "1", "5", or "6" is used. When the value of the field ConnectionCondition is "1", it denotes that a clip referred from the current play item and a clip referred from the immediately earlier play item are not seamlessly connected. When the value of the field ConnectionCondition is "5" or "6", it denotes that a clip referred from the current play item and a clip referred from the immediately earlier play item are seamlessly connected. The term "seamlessly connected" means that the reproduction of clips is controlled such that one clip and the next clip are successfully reproduced at frame timings.

Figure 13A:
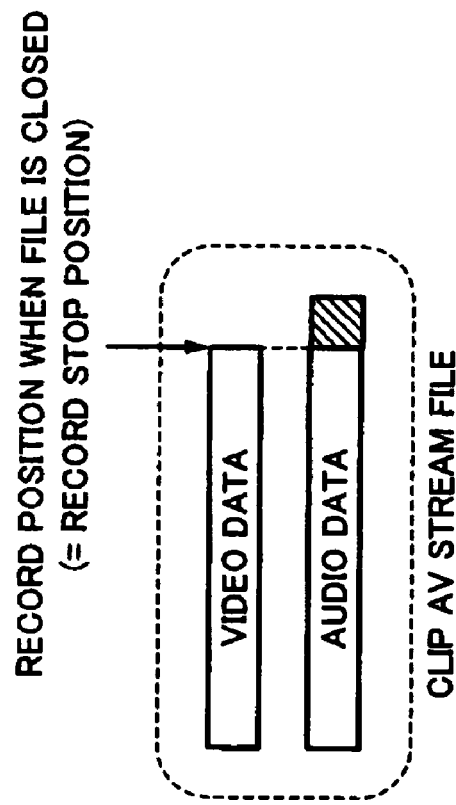
FIG. 13A and FIG. 13B are schematic diagrams for describing first and second seamless connections, respectively.

When the value of the field ConnectionCondition is "5", the recording length of audio data of a clip to which the current play item refers is longer than the recording length of video data thereof (refer to FIG. 13A). Thus, when clips are connected, a fade-out process for audio data can be performed. For example, when a clip is closed by a user's record stop operation, the value of the field ConnectionCondition is "5". Hereinafter, the clip connection method of which the value of the field ConnectionCondition is "5" is referred to as the first seamless connection.

Figure 13B:
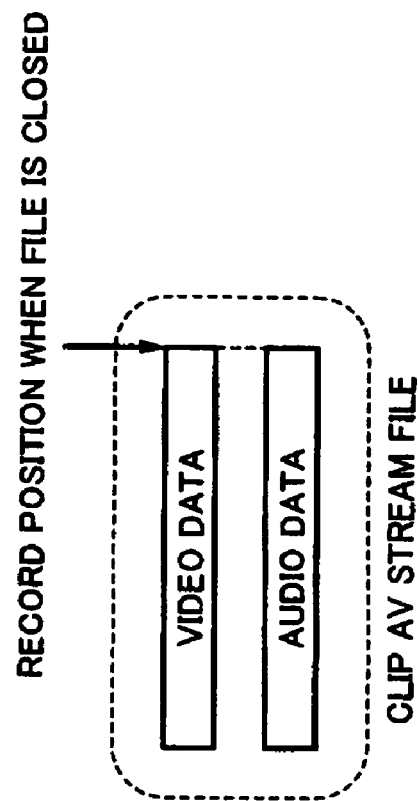

When the value of the field ConnectionCondition is "6", the recording length of audio data of a clip to which the current play item refer is the same as the recording length of video data thereof (refer to FIG. 13B). Thus, clips can be seamlessly connected. For example, when a clip is closed due to a cause of the system other than a user's record stop operation, the value of the field ConnectionCondition is "6". Hereinafter, the clip connection method of which the value of the field ConnectionCondition is referred to as the second seamless connection.

A field RefToSTCID[0] has a data length of 8 bits and represents information about a discontinuous point of a system timebase (STC). A field INTime and a field OUTTime each have a data length of 32 bits and represent the reproduction range of a main clip AV stream. The field INTime represents a start point (IN point), whereas the field OUTTime represents an end point (OUT point).

A block blkUOMaskTable( ) is a table in which an acceptance restriction for a user's input is set. A flag PlayItemRandomAccessFlag that has a data length of 1 bit prescribes permission/restriction of random access for the play item of this block blkPlayItem( ). Thereafter, followed by an area reserved having a data length of 7 bits, a field StillMode is placed. The field StillMode has a data length of 8 bits and denotes whether or not the last picture of the play item in the block blkPlayItem( ) is displayed as a still image. When the value of the field StillMode is "0x01" (binary), a field StillTime that has a data length of 16 bits represents a still time based on an if statement. When the value of the field StillMode is not "0x01", an area having a data length of 16 bits is reserved.

A numeric value with "0x" denotes that it is expressed in hexadecimal notation. This applies to the similar notation.

A block blkSTNTable( ) manages an attribute of the clip AV stream, PID number, record position on the record medium, and so forth that the play item of this block blkPlayItem( ) manages.

FIG. 14 shows syntax that represents an example of the structure of a block blkPlayListMark( ). A field Length has a data length of 32 bits and represents the data length immediately after this field Length until the end of the block blkPlayListMark( ).

A field NumberOfPlayListMark has a data length of 16 bits and represents the number of play list marks contained in this block blkPlayListMark( ). According to the next for loop statement, information of play list marks for the number represented by the field NumberOfPlayListMarks is described.

In the for loop statement, followed by an area reserved having a data length of 8 bits, a field MarkType is placed. The field MarkType has a data length of 8 bits and represents the type of a mark. Play list marks are defined as two types of marks that are an entry mark (Entry Mark) and a link point (Link Point). This field MarkType represents one of these types. To define a chapter, an entry mark is used. Since link points less relate to the present invention, its description will be omitted. The foregoing field NumberOfPlayListMarks represents the total value of entry marks and link points.

A field RefToPlayItemID has a data length of 16 bits and describes identification information PlayItem_id that represents a play item to which a mark is placed. A field MarkTimeStamp has a data length of 32 bits and describes a time stamp that represents a point to which a mark is placed. A field EntryESPID has a data length of 16 bits and represents the value of the PID of a TS packet that contains an elementary stream represented by a mark. A field Duration is an unsigned integer that has a data length of 32 bits and that represents a measured result in the unit of a 45 kHz clock. When the value stored in this field Duration is "0", this field is meaningless.

FIG. 15 shows syntax that represents an example of the structure of a clip information file. A field TypeIndicator has a data length of 32 bits (4 bytes) and denotes that this file is a clip information file. A field TypeIndicator2 has a data length of 32 bits (4 bytes) and represents the version of this clip information file.

This clip information file has a block blkClipInfo( ), a block blkSequenceInfo( ), a block blkProgramInfo( ), a block blkCPI( ), a blockblkClipMark( ), and a block blkExtensionData( ). A field SequenceInfoStartAddress, a field ProgramInfoStartAddress, a field CPIStartAddress, a field ClipMarkStartAddress, and a field ExtensionDataStartAddress each have a data length of 32 bits and represent the start address of their corresponding block.

The field ExtensionDataStartAddress represents the start address of the block blkExtensionData( ) as the relative number of bytes from the beginning of bytes of this clip information file. The relative number of bytes starts with "0". If the value of this field ExtensionDataStartAddress is "0", it denotes that the block blkExtensionData( ) does not exist in this file "index.bdmv".

The block blkClipInfo( ) after an area reserved having a data length of 96 bits preceded by the fields that represents their start address. The block blkClipInfo( ) describes information about a clip AV stream that this clip information file manages. The block blkSequenceInfo( ) describes information with which sequences having continuous STCs and ATCs (arrival time base) are managed as one sequence. The block blkProgramInfo( ) describes information, for example, about the encoding system and aspect ratio of the clip AV stream managed in this clip information file. The block blkCPI( ) stores information, for example, about characteristic point information CPI that represents characteristic points such as a random access start point in the AV stream.

The block blkClipMark( ) describes an index point (jump point) such as a chapter position added to a clip for a cue operation. The block blkExtensionData( ) is an area that can store extension data. Since the block blkClipMark( ) and the block blkExtensionData( ) in the clip information file less relate to the present invention, their description will be omitted.

FIG. 16 shows syntax that represents an example of the structure of a block blkClipInfo( ). A field Length has a data length of 32 bits and represents the data length immediately after this field Length until the end of the block blkClipInfo( ). Followed by an area reserved having a data length of 16 bits, a field ClipStreamType is placed.

The field ClipStreamType has a data length of 8 bits and represents the type of a clip AV stream. The value of this field ClipStreamType is fixed, for example, "1". A field ApplicationType has a data length of 8 bits and denotes how a clip AV stream (a file having an extension "m2ts") has been multiplexed. When the value of the field ApplicationType is "1", the corresponding clip AV stream is reproduced as a regular moving picture. The field ApplicationType is followed by an area reserved having a data length of 31 bits.

A flag IsCC5 has a data length of 1 bit and denotes whether or not the corresponding clip and the next clip are connected by the foregoing first seamless connection, namely the method of which the value of the field ConnectionCondition is "5" with the block blkPlayItem( ) of the play list. When the value of the flag IsCC5 is "1" (binary value), it denotes that clips are connected by the first seamless connection.

A field TSRecordingRate represents the recording rate of a clip AV stream file in the unit of bytes/second. A field NumberOfSourcePackets represents the number of source packets contained in a clip AV stream. Followed by an area reserved having a data length of 1024 bits, a block TSTypeInfoBlock( ) is placed. The block TSTypeInfoBlock( ) stores information that represents the type of packets that store a clip AV stream. Since this block TSTypeInfoBlock( ) less relates to the present invention, its detailed description will be omitted.

When the value of the foregoing flag IsCC5 is "1", followed by an if statement, information is described. Followed by an area reserved having a data length of 8 bits after the if statement, a field FollowingClipStreamType is placed. The field FollowingClipStreamType has a data length of 8 bits and represents the type of a clip preceded by the clip corresponding to the clip information file. Followed by an area reserved having a data length of 32 bits, a field FollowingClipInformaionFileName is placed.

The field FollowingClipInformaionFileName has a data length of 40 bits (5 bytes) and describes the file name of the clip information file corresponding to the next clip of the clip corresponding to this clip information file. The next field ClipCodecIdentifier has a data length of 32 bits (4 bytes) and represents the encoding system of the next clip. In this example, the field ClipCodecIdentifier is a fixed four-letter character string "M2TS" encoded according to a system prescribed in the ISO 646. Next, an area reserved having a data length of 8 bits is placed.

FIG. 17 shows syntax that represents an example of the structure of a block blkSequenceInfo( ). A field Length has a data length of 32 bits and represents the data length immediately after this field Length until the last end of the block blkSequenceInfo( ). Followed by an area reserved having a data length of 15 bits, fixed value "1" having a data length of 1 bits is described.

The next field SPNATCStart has a data length of 32 bits and represents the start of a sequence that denotes that data were recorded in continuous times (referred to as the sequence ATCSequence) with a packet number. In this example shown in FIG. 17, the field SPNATCStart has value "0" that denotes that the beginning of the sequence matches that of the clip AV stream file. A field NumberOfSTCSequence represents the number of sequences STCSequence's of the sequence ATCSequence. The field NumberOfSTCSequence has a value equal to or larger than "1".

According to the next for loop statement, information of the sequences STCSequence is described for the number of entries represented by the field NumberOfSTCSequence. The sequence STCSequence represents a range of which PCRs (Program Clock References) on which the time base of the MPEG2 TS (Transport Stream) is based are continuous. A number STC_id that is unique in a clip is assigned to the sequence STCSequence. In this sequence STCSequence, since a consistent time base that is not discontinuous can be defined, the start time and the end time of a play item can be uniquely defined. In other words, the start time and the end time of each play item need to exist in the same sequence STCSequence. In this for loop statement, the value stc_id designates the sequence STCSequence.

A field PCRPID[stc_id] has a data length of 16 bits and represents the PID of a TS packet that contains a PCR (Program Clock Reference) in the MPEG2 TS. A field SPNSTCStart[stc_id] has a data length of 32 bits and represents the start of the sequence STCSequence with a packet number. A field PresentationStartTime and a field PresentationEndTime each have a data length of 32 bits and represents a range effective in the clip AV stream. The range represented by the field PresentationStartTime and the field PresentationEndTime is a range that can be referred from a play item.

FIG. 18 shows syntax that represents an example of a block blkProgramInfo( ). A field Length has a data length of 32 bits and represents the data length immediately after this field Length until the last end of the block blkProgramInfo( ).

Followed by an area reserved having a data length of 15 bits, fixed value "1" having a data length of 1 bit is described.

A field SPNProgramSequenceStart has a data length of 32 bits and describes a source packet number with which the program sequence starts in the corresponding clip AV stream file starts. A field ProgramMapPID has a data length of 16 bits and represents the value of the PID of a TS packet that likely contains a program map section according to the program sequence. A field NumberOfStreamInPS has a data length of 8 bits and represents the number of elementary streams defined in the program sequence. Followed by the field NumberOfStreamInPS, an area reserved having a data length of 8 bits is placed.

According to the next for loop statement, with a value [stream_index] as a loop variable, pairs of a field StreamPID [stream_index] and a block blkStreamCodingInfo(stream_index) are stored for the number represented by the field NumberOfStreamInPS. The field StreamPID [stream_index] represents the value of the PID corresponding to the elementary stream described in the PMT (Program Map Table) referred by the program sequence. The next block blkStreamCodingInfo(stream_index) describes information with respect to the encoding system of the elementary stream represented by the corresponding field StreamPID [stream_index].

FIG. 19 shows syntax that represents an example of the structure of a block blk(PIC). In an encoded stream such as an MPEG stream that has been inter-frame compressed, the decoding start position is limited to a part of the encoded stream such as the beginning of a GOP (Group Of Picture). A CPI (Characteristic Point Information) is a database of information of decoding start positions. The CPI correlates reproduction times and addresses of a file. In other words, the CPI has a table of information that represents start positions of decoding units.

When such a database is defined, if video data are reproduced from any time, the address of the file corresponding to the reproduction position can be obtained by referring to the CPI on the basis of the reproduction time. Since this address is the beginning of a decoding unit, the player can read the data from the address of the file and quickly display a picture.

The start position of a decoding unit contained in the CPI (in this example, the start position of a GOP) is referred to as an EP (Entry Point) entry.

In FIG. 19, a field Length has a data length of 32 bits and represents the data length immediately after this field Length until the end of the block blkCPI( ). According to the next if statement, unless the value of the field Length is "0", followed by an area reserved having a data length of 12 bits, a field CPIType is placed. The field CPIType has a data length of 4 bits and represents the type of the CPI. The next block blkEPMap stores a table that associates PTS values with byte addresses of the corresponding clip AV stream file.

FIG. 20 shows syntax that represents an example of the structure of a block blkEPMap( ). Followed by an area reserved having a data length of 8 bits, a field NumberOfStreamPIDEntries is placed. The field NumberOfStreamPIDEntries has a data length of 8 bits and represents the number of entries of blocks blkEPMapForOneStreamPID's in the block blkEPMap( ). According to a for loop statement, with a loop variable of a value [k], information about entry points is described for the number represented by the field NumberOfStreamPIDEntries.

In the for loop statement, a field StreamPID[k] has a data length of 16 bits and represents the value of the PID of a transport packet that transports an elementary stream referred from a block blkEPMapForOneStreamPID as a [k]-th entry of the block blkEPMap( ) (hereinafter, described as the [k]-th a block blkEPMapForOneStreamPID).

Followed by an area reserved having a data length of 10 bits, a field EPStreamType[k] is placed. The field EPStreamType[k] has a data length of 4 bits and represents the type of an elementary stream referred from the [k]-th block blkEPMapForOneStreamPID. A field NumberOfEPCoarseEntries [k] has a data length of 16 bits and represents the number of entries in a coarse unit search sub table (EP coarse table) in the [k]-th block blkEPMapForOneStreamPID. A field NumberOfEPFineEntries[k] has a data length of 18 bits and represents the number of entries in a fine unit search sub table (EP fine table) in the [k]-th block blkEPMapForOneStreamPID. A field EPMapForOneStreamPIDStartAddress[k] has a data length of 32 bits and represents the relative byte position of the beginning of the [k]-th block blkEPMapForOneStreamPID in the block blkEPMap( ). This value is represented by the number of bytes from the first byte of the block blkEPMap( ).

After the description of the foregoing for loop statement, followed by a padding word having a data length of an integer multiple of 16 bits, according to a for loop statement, with a loop variable of a value [k], blocks blkEPMapForOneStreamPID(EPStreamType[k], NumberOfEPCoarseEntries[k], and NumberOfEPFineEntries[k])'s are stored for the number represented by the field NumberOfStreamPIDEntries. In other words, the argument NumberOfEPCoarseEntries[k] represents the number of entries PTSEPCoarse's and entries SPNEPCoarse's stored in the sub table (EP coarse table). Likewise, the argument NumberOfEPFineEntries[k] represents the number of entries PTSEPFine's and entries SPNEPFie's stored in the sub table (EP fine table). Hereinafter, the argument NumberOfEPCoarseEntries[k] and the argument NumberOfEPFineEntries[k] are sometimes referred to as the number of entries Nc and the number of entries Nf, respectively.

FIG. 21 shows syntax that represents an example of the structure of a block blkEPMapForOneStreamPID(EP_stream_type, Nc, Nf). To describe semantics of the block blkEPMapForOneStreamPID(EP_stream_type, Nc, Nf), meaning of an entry PTSEPStart and an entry SPNEPStart that are entries as the sources of data stored in the block blkEPMapForOneStreamPID(EP_stream_type, Nc, Nf) will be described.

An entry PTSEPStart and an entry SPNEPStart associated with the entry PTSEPStart represent entry points of an AV stream. An entry PTSEPFine and an entry PTSEPCoarse associated with an entry PTSEPFine are obtained from the same entry PTSEPStart. In addition, an entry SPNEPFine and an entry SPNEPCoarseassociated with an entry SPNEPFine are obtained from the same entry SPNEPStart.

FIG. 22 shows an example of formats of the entry PTSEPCoarse and the entry PTSEPFine. The PTS, namely the entry PTSEPStart, has a data length of 33 bits. When the MSB and the LSB of the entry PTSEPStart are 32-th bit and 0-th bit, respectively, in the example shown in FIG. 22, 14 bits from the 32-th bit to the 19-th bit of the entry PTSEPStart are used for the entry PTSEPCoarse for a coarse unit search. The entry PTSEPCoarse allows for a search with a resolution in the range from 5.8 seconds. to 26.5 hours. Eleven bits from the 19-th bit to the 9-th bit of the entry PTSEPStart are used for the entry PTSEPFine for a fine unit search. The entry PTSEPfine allows for a search with a resolution in the range from 5.7 milliseconds to 11.5 seconds. The 19-th bit of the entry PTSEPStart is commonly used for the entry PTSEP- Coarse and the entry PTSEPFine. Nine bits from the 0-th bit to the 8-th bit on the LSB side of the entry PTSEPStart are not used.

Figure 23:
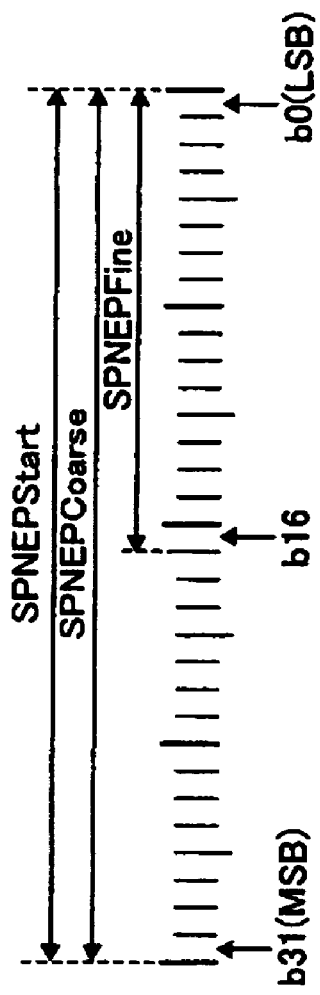
FIG. 23 is a schematic diagram showing an example of the format of an entry SPNEPCoarse and an entry SPNEPFine.

FIG. 23 shows an example of the formats of the entry SPNEPCoarse and the entry SPNEPFine. The source packet number, namely the entry SPNEPStart has a data length of 32 bits. When the MSB and the LSB of the entry SPNEPStart are 31-st bit and 0-th bit, in the example shown in FIG. 23, all bits from the 31-st bit to the 0-th bit of the entry SPNEPStart are used for the entry SPNEPCoarse for a coarse unit search. Seventeen bits from the 16-th bit to the 0-th bit of the entry SPNEPStart are used for the entry SPNEPFine for a fine unit search. The entry SPNEPFine allows for a search for up to around 25 MB (Mega Byte) AV stream file.

For a source packet number, a predetermined number of bits on the MSB side of the entry SPNEPCoarse may be used. For example, seventeen bits from the 31-st bit to the 16-th bit of the entry SPNEPStart may be used for the entry SPNEPCoarse and seventeen bits from the 16-th bit to the 0-th bit of the entry SPNEPStart may be used for the entry SPNEPFine.

Based on the foregoing, the entry PTSEPStart and the entry SPNEPStart are defined as follows.

As shown in FIG. 22, the entry PTSEPStart is an unsigned integer that has a data length of 33 bits and represents a PTS having a data length of 33 bits of a video access unit that starts with a random accessible picture (for example, an IDR (Instantaneous Decoding Refresh) picture or an I (Intra) picture) of an AV stream.

As shown in FIG. 23, the entry SPNEPStart is an unsigned integer having a data length of 32 bits and represents the address of a source packet including the first byte of a video access unit associated with the entry PTSEPStart in an AV stream file. The entry SPNEPStart is represented as a source packet number. The entry SPNEPstart is counted as a value that starts with "0" and increments by 1 for each source packet from the first source packet of an AV stream file.

Referring to FIG. 21, the block blkEPMapForOneStreamPID(EP_stream_type, Nc, Nf) describes a first for loop statement and a second for loop statement. The first for loop statement describes a sub table (EP coarse table) for a coarse unit search. The second for loop statement describes a sub table (EP fine table) for a fine unit search performed on the basis of the search result of the sub table (EP coarse table).

The first for loop statement is immediately preceded by a field EPFineTableStartAddress. The field EPFineTableStartAddress has a data length of 32 bits and represents the start address of the first byte of a field ReservedEPFine[EP_fine_id] of the second for loop as the relative number of bytes from the first byte of the block blkEPMapForOneStreamPID (EP_stream_type, Nc, Nf). The relative number of bytes starts with value "0".

The first for loop statement is repeated with a loop variable [i] the number of times presented by the number of entries of the sub table (EP coarse table). Pairs of a field RefToEPFineID[i], an entry PTSEPCoarse[i], and an entry SPNEPCoarse[i] are stored for the number represented by the number of entries Nc. In the first for loop statement, the field RefToEPFine[i] has a data length of 18 bits and represents the entry number in the sub table (EP fine table) of the entry PTSEPFine associated with the entry PTSEPCoarse represented by the field PTSEPCoarse[i] preceded by the field RefToEPFineID[i]. The entry PTSEPFine and the entry PTSEPCoarse associated with this entry PTSEPFine are obtained from the same entry PTSEPStart. The field RefToEPFineID[i] is obtained by the value of the loop variable [EP_fine_id] defined in the order described in the second for loop statement.

After the first for loop statement, followed by a padding word, the second for loop statement is described. The second for loop statement is repeated with a loop variable [EP_fine_id] the number of times represented by the number of entries Nf of the sub table (EP fine table). Pairs of a field ReservedEPFine[EP_fine_id] having a data length of 1 bit, a field IEndPositionOffset[EP_fine_id] having a data length of 3 bits, a field PTSEPFine[EP_fine_id] having a data length of 11 bits, and a field SPNEPFine[EP_fine_id] having a data length of 17 bit are stored for the number represented by the number of entries Nf. Among of these fields, the field PTSEPFine[EP_fine_id] and the field SPNEPFine[EP_fine_id] stores the entry PTSEPFine and the entry SPNEPFine, respectively, referred from the sub table (EP fine table) on the basis of the loop variable [EP_fine_id].

The entry PTSEPCoarse and the entry PTSEPFine and the entry SPNEPCoarse and the entry SPNEPFine are obtained as follows. Assuming that sub table (EP fine table) contains Nf entries arranged in the ascending order of the values of associated data SPNEPStart. Each entry PTSEPFine is obtained from the corresponding entry PTSEPStart according to the following formula (1).

$$\text{PTSEPFine}[EP\_fine\_id] = (\text{PTSEPStart}[EP\_fine\_id] >> 9)/2^{11} \quad (1)$$

The relationship between the entry PTSEPCoarse and the corresponding entry PTSEPFine is expressed by the following formulas (2) and (3).

$$\text{PTSEPCoarse}[i] = (\text{PTSEPStart}[\text{RefToEPFineID}[i]] >> 19)/2^{14} \quad (2)$$

$$\text{PTSEPFine}[\text{RefToEPFineID}[i]] = (\text{PTSEPStart}[\text{RefToEPFineID}[i]] >> 9)/2^{11} \quad (3)$$

Each entry SPNEPFine is obtained from the corresponding entry SPNEPStart according to the following formula (4).

$$\text{SPNEPFine}[EP\_fine\_id] = \text{SPNEPStart}[EP\_fine\_id]/2^{17} \quad (4)$$

The relationship between the entry SPNEPCoarse and the corresponding entry SPNEPFine is expressed by the following formulas (5) and (6).

$$\text{SPNEPCoarse}[i] = \text{SPNEPStart}[\text{RefToEPFineID}[i]] \quad (5)$$

$$\text{SPNEPFine}[\text{RefToEPFineID}[i]] = \text{SPNEPStart}[\text{RefToEPFineID}[i]]/2^{17} \quad (6)$$

In the foregoing formulas (1) to (6), symbol ">>x" denotes that bits having digits in excess of x bits on the LSB side are used.

Next, a block blkExtensionData( ) for storing extension data will be described. This block blkExtensionData( ) is defined such it can store predetermined extension data. The block blkExtensionData( ) can be described in each of the file "index.bdmv" that stores an index table, the file "xxxxx.mpls" that stores a play list, and a clip information file "zzzzz.clpi".

FIG. 24 shows syntax that represents an example of the structure of a block blkExtensionData( ). A field Length has a data length of 32 bits and represents the data length immediately after this field Length until the end of the block blkExtensionData( ) in bytes. Unless the data length represented by the field Length is "0", followed by an if statement, information is described.

A field DataBlockStartAddress has a data length of 32 bits and represents the start address of a block DataBlock( ) that stores the main body of extension data of this syntax as the relative number of bytes from the beginning of bytes of the block blkExtensionData( ). In other words, the relative number of bytes starts with "0". The field DataBlockStartAddress needs to satisfy a 32-bit alignment condition that follows.
DataBlockStartAddress % 4=0

Followed by an area reserved having a data length of 24 bits, a field NumberOfExtDataEntries is placed. The field NumberOfExtDataEntries has a data length of 8 bits and represents the number of entries of extension data stored in the block DataBlock( ) of the block blkExtensionData( ). Entries of extension data store information necessary to obtain the main body of extension data. In this example, entries of extension data are a block ext_data_entry( ) that is composed of a field ExtDataType, a field ExtDataVersion, a field ExtDataStartAddress, and a field ExtDataLength. In the block blkExtensionData( ), blocks ext_data_entry( )'s exist for the number represented by the field NumberOfExtDataEntries according to the first for loop statement.

The field ExtDataType has a data length of 16 bits and denotes that extension data contained in this block blkExtensionData( ) are extension data for a recording apparatus. The value of this field ExtDataType is a first value with which extension data are identified. The value of the field ExtDataType can be defined to be assigned by a licensor of a standard including this block blkExtensionData( ). The field ExtDataVersion is a second value with which extension data are identified. The field ExtDataversion can be defined to represent the version number of this extension data. In this block blkExtensionData( ), two or more entries of block ext_data_entry( ) cannot exist when the values of the field ExtDataType and the field ExtDataVersion of these entries are the same.

The field ExtDataStartAddress has a data length of 32 bits and represents the start address of extension data corresponding to the entry (block ext_data_entry( )) of extension data that contain this field ExtDataStartAddress. The field ExtDataStartAddress represents the start address of extension data ext_data as the relative number of bytes from the beginning of bytes of the block blkExtensionData( ). The field ExtDataStartAddress needs to satisfy a 32-bit alignment condition that follows.
ExtDataStartAddress % 4=0

The field ExtDataLength has a data length of 32 bits and represents the data length of extension data corresponding to the entry (block ext_data_entry( )) of extension data that contain the field ExtDataStartAddress. The data length is represented in bytes.

When entries (blocks ext_data_entry( )'s) of extension data are described for the number represented by the field NumberOfExtDataEntries, a field padding_word having a data length of 16 bits and composed of any data sequence is repeated the number of times L1 as pairs of two fields. Thereafter, the block DataBlock( ) that stores the main body of extension data is described. The block DataBlock( ) stores at least one entry of extension data. Each entry of extension data ext_data is obtained from the block DataBlock( ) based on the foregoing field ExtDataStartAddress and field ExtDataLength.

Figure 25:
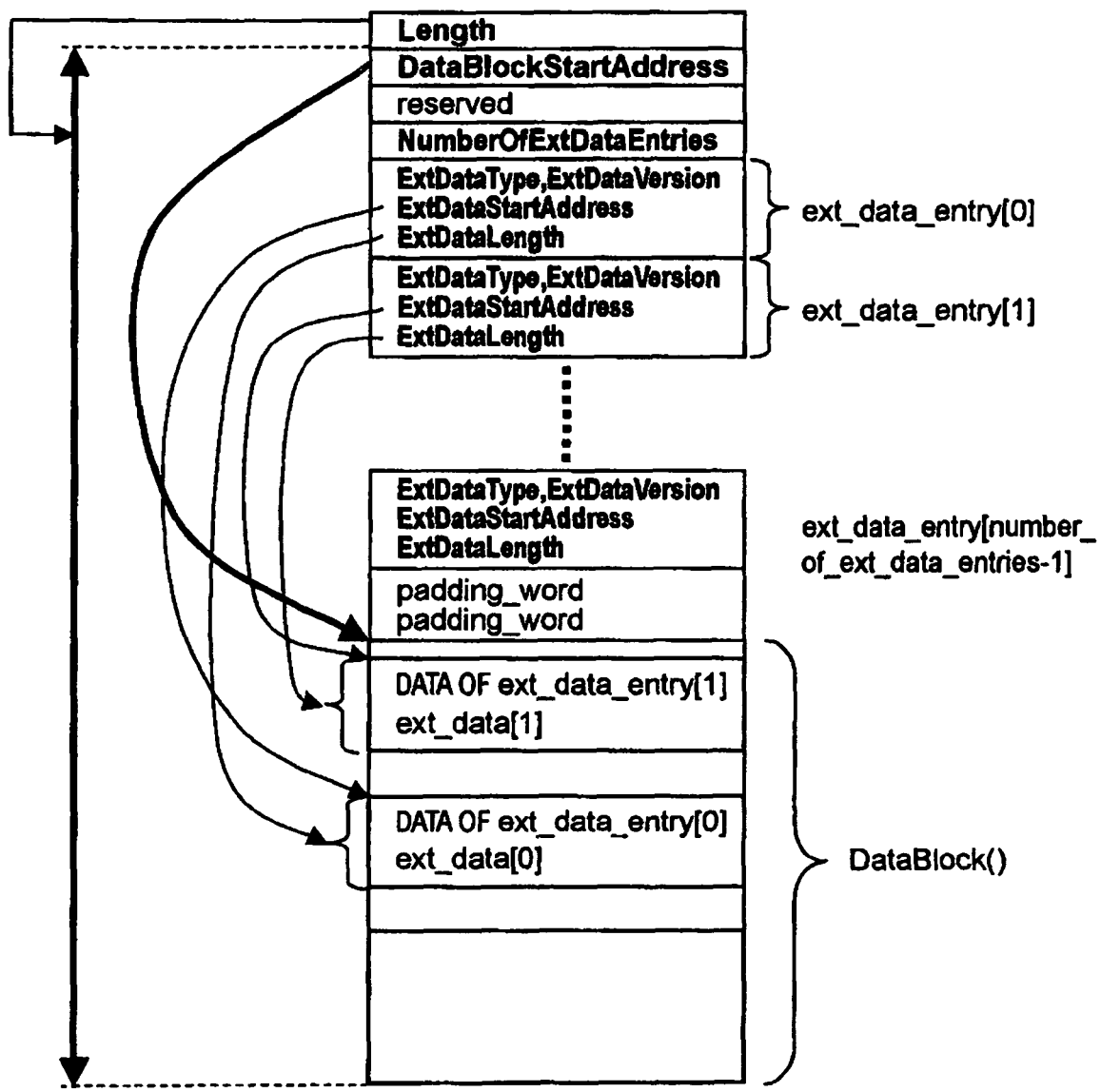
FIG. 25 is a schematic diagram showing the relationship of references of each entry of data of the block blkExtensionData( )

FIG. 25 shows the relationship of references of entries of data in the block blkExtensionData( ). A field length represents the data length immediately after the field Length until the end of the block blkExtensionData( ). A field DataBlockStartAddress represents the start position of a block DataBlock( ). Blocks ext_data_entry's are described for the number represented by a field NumberOfExtDataEntries. A field padding_word having any data length is placed between the last block ext_data_entry and the block DataBlock( ).

In the block DataBlock( ), extension data ext_data represented by a block ext_data_entry( ) is placed. The position and data length of each of extension data ext_data's are represented by a field ExtDataStartAddress and a field ExtDataLength of the corresponding block ext_data_entry( ). Thus, the order of extension data ext_data's in the block DataBlock( ) may not need to match the order of the corresponding block' ext_data_entry( )'s.

When extension data are structured in two layers of the block DataBlock( ) that stores the main body of the extension data and the block ext_data_entry( ) that stores access information for extension data contained in the block DataBlock( ), a plurality of entries of extension data can be stored.

Figure 26:
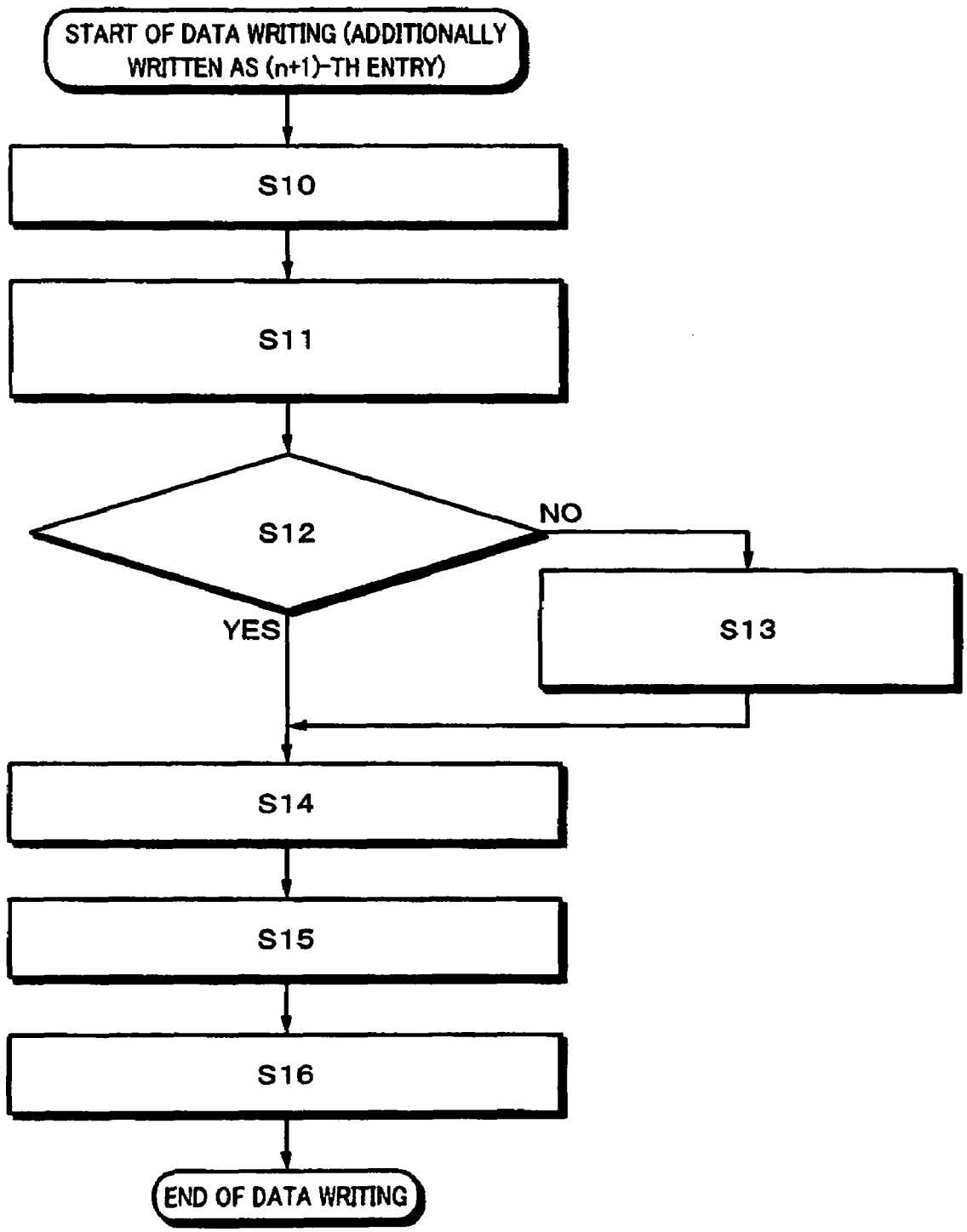
FIG. 26 is a flow chart showing an example of a process of writing data to the block blkExtensionData( )

Next, an example of a method of creating and reading the foregoing extension data will be described. FIG. 26 is a flow chart showing an example of a process of writing data in the block blkExtensionData( ). FIG. 26 shows an example of which extension data are added as an (n+1)-th entry to the block blkExtensionData( ) such that the block blkExtensionData( ) is rewritten.

First of all, at step S10, the data length of extension data to be written is obtained and set as the value of the field ExtDataLength[n+1]. The notation "[n+1]" represents an (n+1)-th entry number. At the next step S11, the values of the field ExtDataLength and the field ExtDataStartAddress of blocks ext_data_entry( )'s listed in the current block blkExtensionData( ) are checked and the use state of the block DataBlock( ) is obtained.

At the next step S12, it is determined whether or not the block DataBlock( ) has a continuous free area equal to or larger than the data length represented by the field ExtDataLength[n+1] that represents the data length of extension data to be written. When the determined result denotes that block DataBlock( ) has such an area, the flow of the process advances to step S14.

In contrast, when the determined result denotes that the block DataBlock( ) does not have a continuous free area that is in excess of the data length represented by the field ExtDataLength[n+1], the flow of the process advances to step S13. At step S13, the value of the field Length of the block blkExtensionData( ) is increased such that a continuous free area that is equal to or larger than the data length represented by the field ExtDataLength[n+1] is created in the block DataBlock( ). After such a free area has been created, the flow of the process advances to step S14.

At step S14, the start address of the area in which the extension data are written is decided such that the value of the start address is set to the field ExtDataStartAddress[n+1]. At the next step S15, the extension data ext_data[n+1] having the data length represented by the field ExtDataLength[n+1] that has been set at step S10 are written from the field ExtDataStartAddress[n+1].

After the data have been written, the flow of the process advances to step S16. At step S16, the field ExtDataLength[n+1] and the field ExtDataStartAddress[n+1] are added to the block ext_data_entry( ).

In the foregoing, it is assumed that the block blkExtensionData( ) to be rewritten has been read from a record medium such as a disc and stored in the memory of the recording apparatus. Thus, the increase of the block blkExtensionData( ) by changing the value of the field Length at step S13 is performed by the system. The system properly allocates the memory.

Figure 27:
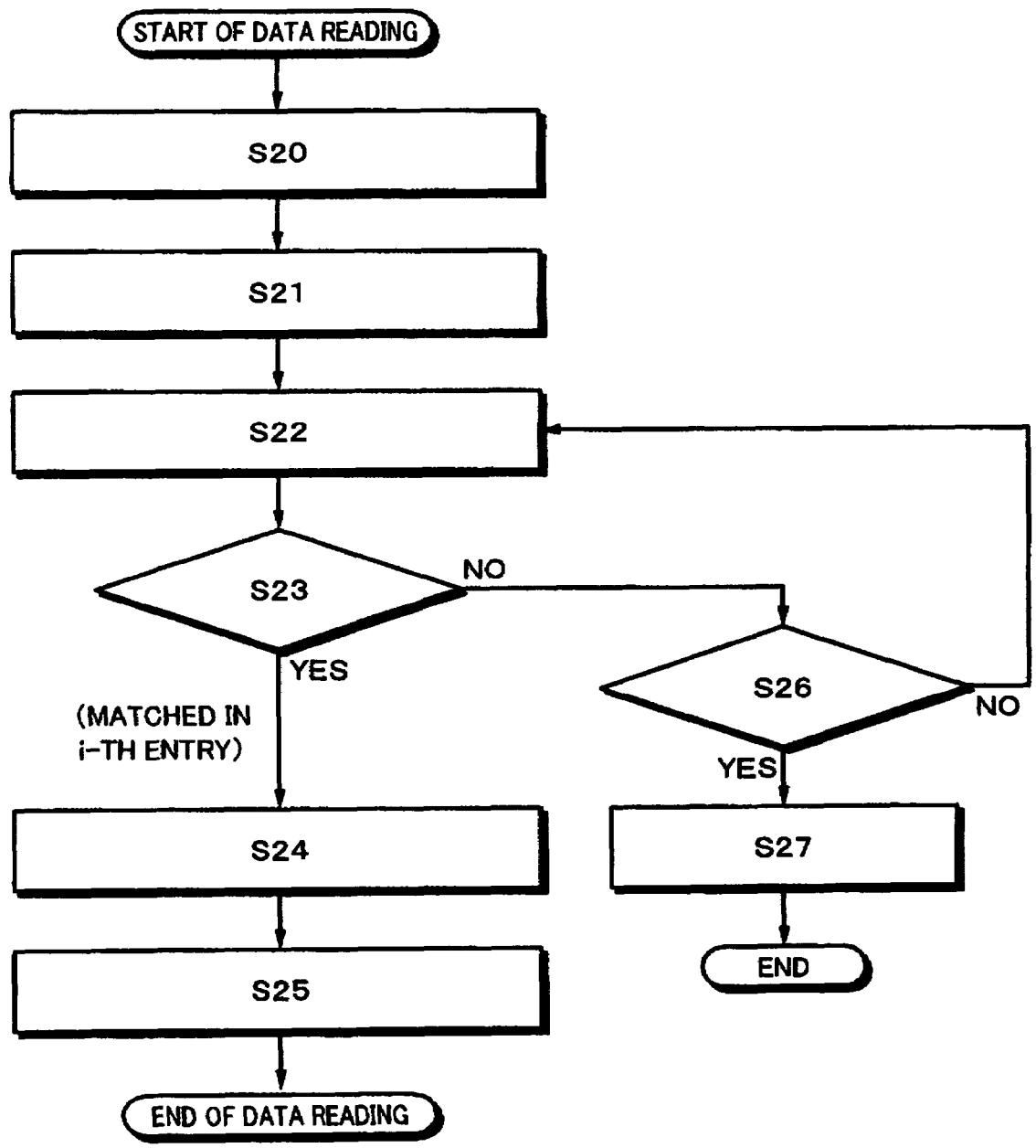
FIG. 27 is a flow chart showing an example of a process of reading extension data from the block blkExtensionData( )

FIG. 27 is a flow chart showing an example of a process of reading extension data from the block blkExtensionData( ).

The process of the flow chart shown in FIG. 27 can be applied both to a reproduction-only record medium and a recordable record medium. First of all, at step S20, the value of the field ExtDataType is obtained from the standard on which extension data to be read are based. At step S21, the value of the field ExtDataVersion is obtained from the type of extension data to be read.

At the next step S22, each of blocks ext_data_entry( )'s listed in the block blkExtensionData( ) is read one by one. At step S23, it is determined whether or not the values of the field ExtDataType and the field ExtDataVersion of each of blocks ext_data_entry( )'s match the values of the field ExtDataType and the field ExtDataVersion obtained at the foregoing steps S20 and S21.

When the determined result denotes that they do not match, the flow of the process advances to step S26. At step S26, it is determined whether or not all blocks ext_data_entry( )'s listed in the block blkExtensionData( ) have been read. When the determined result denotes that all blocks ext_data_entry( )'s have been read, the flow of the process advances to step S27. At step S27, since extension data to be read do not exist in the block blkExtensionData( ), the process is completed. In contrast, when the determined result denotes that all blocks ext_data_entry( )'s have not been read, the flow of the process returns to step S22. At step S22, the next block ext_data_entry( ) is read.

When the determined result at step S23 denotes that the values of the field ExtDataType and the field ExtDataVersion of the block ext_data_entry( ) match the values of the field ExtDataType and the field ExtDataVersion obtained at the foregoing steps S20 and S21, the flow of the process advances to step S24. In this example, it is assumed that they match for the [i]-th entry of the block blkExtensionData( ).

At step S24, the value of the field ExtDataLength[i] and the value of the field ExtDataStartAddress[i] are read from the [i]-th entry of the block ext_data_entry( ). At step S25, data are read from the address represented by the field ExtDataStartAddress[i] that has been read at step S24 for the data length represented by the field ExtDataLength[i].

Next, the extension data block blkExtensionData( ) that stores extension data and that can be defined in the foregoing index file "index.bdmv", movie object file "MovieObject.bdmv", play list file "xxxxx.mpls", and clip information file "zzzzz.clpi" will be described.

First of all, an example of an extension data block defined in the index file "index.bdmv" will be described. In this example, an extension data block of which attribute information unique to a recordable record medium is added to each play list will be described. FIG. 28 shows syntax that represents an example of the structure of a block DataBlock( ) (refer to FIG. 24) of a block blkExtensionData( ) in the file "index.bdmv". In the example shown in FIG. 28, the block DataBlock( ) is described as the block blkIndexExtensionData( ).

First of all, with reference to FIG. 24, value "0x1000" and value "0x0100" are set to the field ExtDataType and the field ExtDataVersion of the block blkExtensionData( ), respectively. The values that have been described in these field ExtDataType and field ExtDataVersion are identified with reference to a table that has been stored, for example, in the ROM (Read Only Memory) on the reproducing apparatus side. The block blkIndexExtensionData( ) is stored in an area represented by the field ExtDataStartAddress and the field ExtDataLength in the block DataBlock( ).

In the block blkIndexExtensionData( ), a field TypeIndicator describes a four-letter character string encoded according to an encoding system prescribed in the ISO 646. The four-letter character string represents the type of data that follow. In the example shown in FIG. 28, the field TypeIndicator describes a four-letter character string "IDEX" that has been encoded according to the system prescribed in the ISO 646 and that denotes that the type of data that follow is extension data of an index file.

The field TypeIndicator is followed by an area reserved having a data length of 32 bits, followed by a field TableOfPlayListStartAddress having a data length of 32 bits. The field TableOfPlayListStartAddress represents the start address of the block blkTableOfPlayList( ) based on the beginning of this block blkIndexExtensionData( ).

The field TableOfPlayListStartAddress is followed by a field MakersPrivateDataStartAddress having a data length of 32 bits. The field MakersPrivateDataStartAddress represents the start address of a block blkMakersPrivateData( ) based on the beginning of the block blkIndexExtensionData( ). Followed by an area reserved having a data length of 192 bits, a block blkUIAppInfoAVCHD( ) is placed. A padding word padding_word having a data length of 16 bits is repeated the number of times represented by a value N1. Thereafter, the block blkTableOfPlayList( ) is placed. Thereafter, a padding word padding_word having a data length of 16 bits is repeated the number of times represented by a value N2. Thereafter, a block blkMakersPrivateData( ) is placed. The block blkMakersPrivateData( ) is followed by a padding word padding_word having a data length of 16 bits. The padding word padding_word is repeated the number of times represented by a value N3.

Since the block blkUIAppInfoAVCHD( ) and the block blkMakersPrivateData( ) less relate to the present invention, their description will be omitted.

FIG. 29 shows syntax that represents an example of the structure of the foregoing block blkTableOfPlayList( ). A field length has a data length of 32 bits and represents the data length immediately after this field Length until the end of the block blkTableOfPlayList( ) in bytes. The field Length is followed by a block blkFirstPlaybackTitlePlayLists( ) that describes information about a play list with which a playback title is reproduced and a block blkMenuTitlePlayLists( ) that describes information about a menu title. Since these block blkFirstPlaybackTitlePlayLists( ) and block blkMenuTitlePlayLists( ) less relate to the present invention, their description will be omitted.

Thereafter, a field NumberOfTitlePlayListPair having a data length of 16 bits is placed. The field NumberOfTitlePlayListPair describes the number of play lists with which a title other than a playback title and a menu title is reproduced. According to the next for loop statement, blocks blkMovieTitlePlayListPair( )'s are described for the number represented by the field NumberOfTitlePlayListPair. The block blkMovieTitlePlayListPair( ) contains a field PlayListFileName, a field PlayListAttribute, and a field RefToTitleID. In other words, the block blkMovieTitlePlayListPair( ) structurizes information of composed of the file name, attributes, and reference title ID for the [i]-th play list represented by this for loop statement.

Entries in the for loop statement are based on the order of which they are recorded. In other words, when one play list is added, the value of the field NumberOfTitlePlayListPair is incremented by "1" and information of the added play list is additionally written after information of existing play lists.

The field PlayListFileName has a data length of 40 bits (5 bytes) and describes the file name of the play list that has been encoded according to an encoding system prescribed in the ISO 646. The field PlayListFileName is followed by an area reserved having a data length of 6 bits, followed by the field PlayListAttribute. The field PlayListAttribute has a data length of 2 bits and represents an attribute assigned to the current play list. Play lists are categorized on the basis of their causes as a first type created together with a clip, a second type corresponding to a play list created with an existing title or all or a part of a play list, and a third type used to reproduce a menu. Each play list is assigned an attribute "Real" (first type), an attribute "Virtual" (second type), or an attribute "Menu" (third type) depending on the type of the play list.

Hereinafter, a play list assigned the attribute "Real" is referred to as a real play list. A play list assigned the attribute "Virtual" is referred to as a virtual play list. A play list assigned the attribute "Menu" is referred to as a menu play list.

The field RefToTitleId describes the ID (number) of the title to which the play list represented in the field PlayListFileName of the same loop belongs when the play list is created. As a more specific example, the field RefToTitleId describes the corresponding value title_id of the block blkIndexes( ) in the index file "index.bdmv". When this play list is reproduced only from a first play back title, the value of the field RefToTitleId is a first fixed value, for example, "0xFFFF". On the other hand, when this play list is reproduced only from a menu title, the value of the field RefToTitleId is a second fixed value, for example, "0xFFFE".

Next, a virtual player will be described in brief. When a disc having the foregoing data structure is loaded into a player, the player needs to convert commands contained in a movie object or the like that has been read from the disc into unique commands with which hardware of the player is controlled. The player has stored software with which such conversion is performed for these commands in a ROM (Read Only Memory) built in the player. Since this software causes the player to operate in accordance with prescriptions of the AVCHD format through the disc and the player, this software is referred to as the virtual player.

Figure 30:
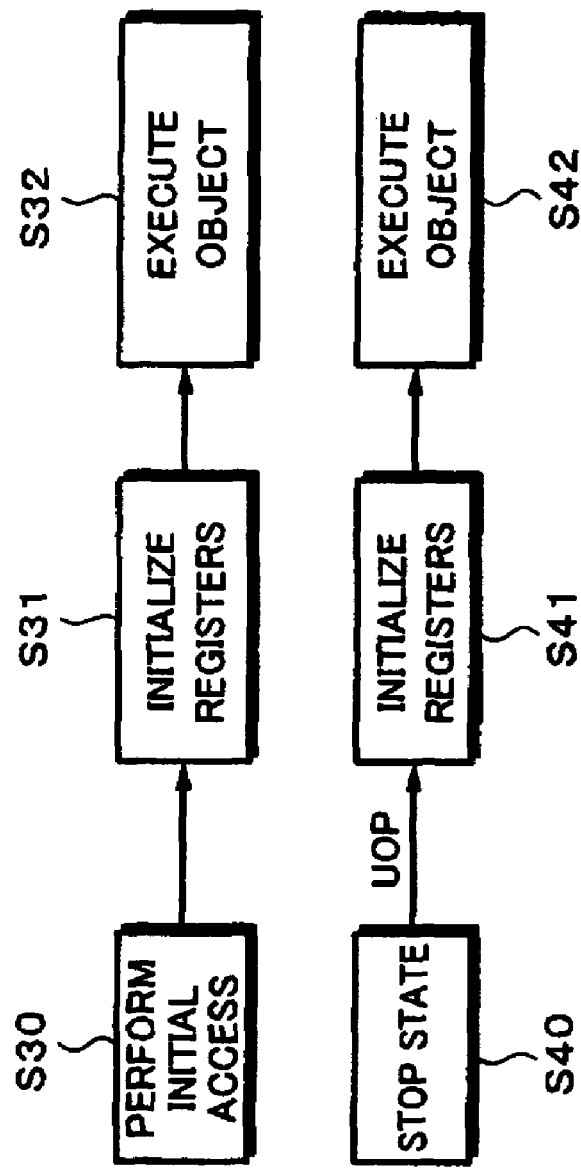
FIG. 30A and FIG. 30B are flow charts showing an outline of the operation of a virtual player.

FIG. 30A and FIG. 30B show an outline of the operation of the virtual player. FIG. 30A shows an example of which the virtual player loads a disc. When the disc is loaded into the player and the disc is initially accessed (at step S30), registers that store common parameters commonly used for one disc are initialized (at step S31). At the next step S32, a program described in a movie object or the like is read from the disc and executed. The initial access denotes that data are initially reproduced from the disc, for example, when the disc is loaded.

FIG. 30B shows an example of the operation of the player in the case that the user presses, for example, a play key in the stop state to command the player to reproduce data from the disc. In the initial stop state (at step S40), the user commands the player to reproduce data from the disc, for example, with a remote control commander or the like (UO: User Operation). When the player is commanded to reproduce data from the disc, the registers, namely common parameters, are initialized (at step S41). At the next step S42, a movie object execution phase starts.

Next, with reference to FIG. 31, the reproduction of a play list in the movie object execution phase will be described. It is assumed that by the UO or the like, the player has been commanded to start reproducing contents of title #1 from the disc. When the player has been commanded to start reproducing contents from the disc, the player refers to the index table (Index Table) shown in the foregoing FIG. 2 and obtains an object number corresponding to the reproduction of contents of title #1. Assuming that the number of an object that accomplishes the execution of contents of title #1 is #1, the player starts executing movie object #1.

Figure 31:
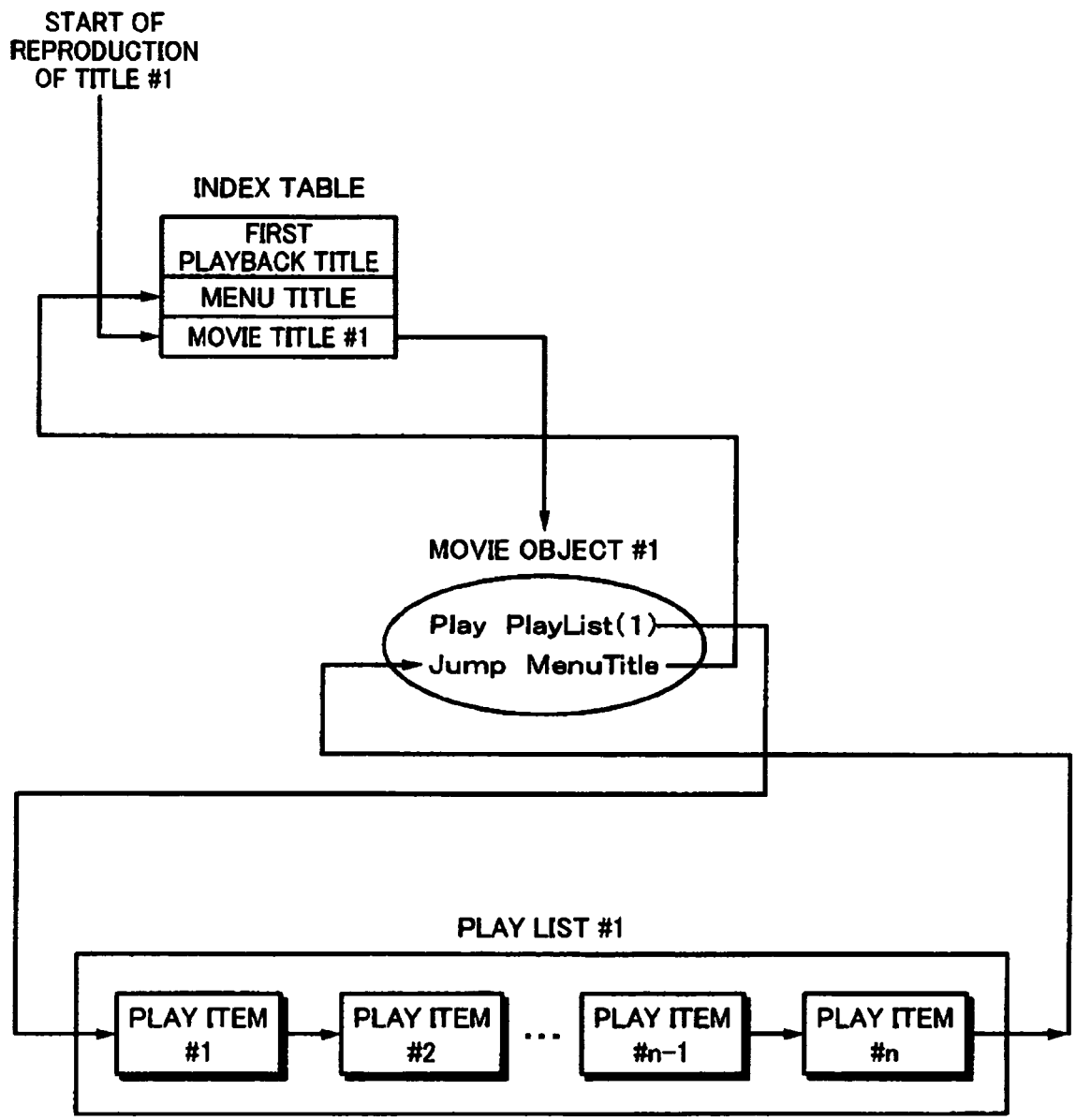
FIG. 31 is a schematic diagram showing an outline of the operation of the virtual player.

In the example shown in FIG. 31, assuming that a program described in movie object #1 is composed of two lines and a command of the first line is "Play PlayList(1)", the player starts reproducing play list #1. Play list #1 is composed of one or more play items. The player continuously reproduces the play items. After the player has completed the reproduction of all the play items of play list #1, the player restores the execution of movie object #1 and executes a command of the second line. In the example shown in FIG. 31, the command of the second line is "jump MenuTitle". The player executes this command and starts executing a movie object that accomplishes the menu title (MenuTitle) described in the index table.

Next, an embodiment of the present invention will be described. In the present invention, when video data and audio data are recorded, information of a file to which video data and audio data are recorded and a predetermined restriction on the system are compared. Based on the compared result, it is determined whether or not the file is divided to continue recording. When determined that information of the file exceed the predetermined restriction on the system, the file that is being currently created is closed, a file is newly created, and video data and audio data that are continuously being recorded are stored in the newly created file.

Since a file in which video data and audio data are stored is automatically divided on the basis of the restriction on the system, the user can continuously perform recording without necessity of recognizing the restriction on the system.

Information that represents a file that has been newly created is contained in management information of the file that has been closed. In addition, identification information that denotes that video data and audio data stored in the closed file and those stored in the newly created file are seamlessly reproduced is contained in the management information of the closed file.

Thus, upon reproducing, even if a file in which video data and audio data that have been continuously recorded has been divided into two files due to the restriction on the system, they can be continuously reproduced without necessity of recognizing them.

The restriction on the system can be contemplated to be, for example, the maximum file size. When a file that stores video data and audio data recorded by the recording apparatus according to the present invention is handled by an external apparatus such as a computer apparatus, the size of a file that can be created by the recording apparatus is restricted on the basis of the restriction of the maximum file size on the file system that the external apparatus uses. As an example of file systems that many apparatus can handle, the FAT 16 can be contemplated. In the FAT 16, the maximum file size of one file is defined as 2 GB. For example, in the system of the recording apparatus, the maximum size of one file is decided corresponding thereto, the size of a clip AV stream file in which video data and audio data that are recorded are stored is monitored, when the file size exceeds 2 GB, the file that is currently being recorded is closed, a file is newly created, and video data and audio data are recorded to the newly created file.

As another example of the restriction on the system, the maximum value of information that represents the relationship between address information and time information can be contemplated. In other words, in the AVCHD, with respect to EP entries described with reference to FIG. 19 to FIG. 23, an upper limit is set for the number of EP entries that can be stored in one clip information file. Thus, when the number of EP entries monitored while video data and audio data are being recorded exceeds the maximum value of EP entries that can be stored in on clip information file, the file that is currently being recorded is closed and a file is newly created.

Figure 32:
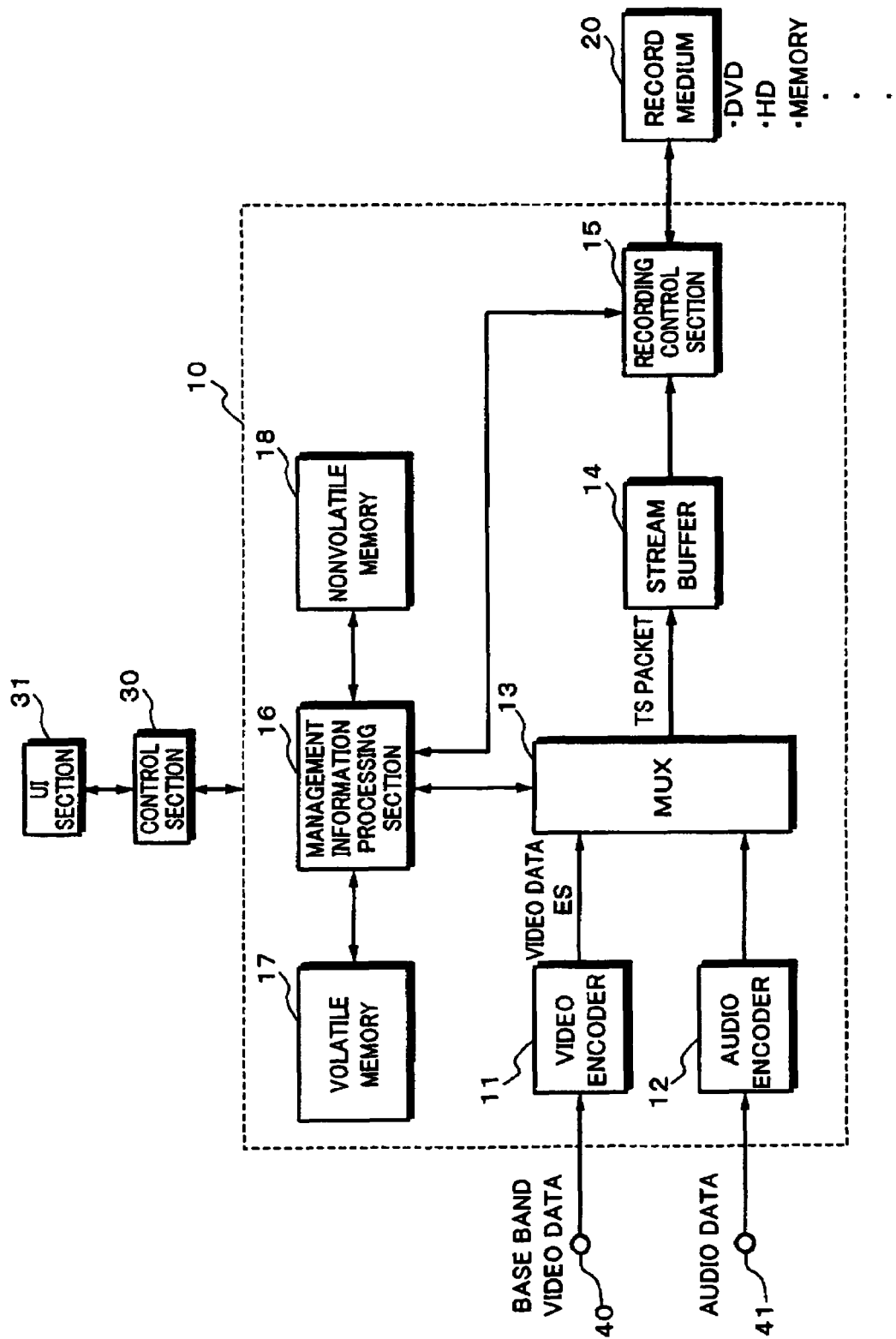
FIG. 32 is a block diagram showing an outline of an example of the structure of a recording apparatus according to an embodiment of the present invention.

FIG. 32 shows an outline of an example of the structure of a recording apparatus according to an embodiment of the present invention. This recording apparatus records an AV stream of which input digital video data and digital audio data have been compression-encoded and multiplexed on the basis of a predetermined system to a record medium.

The recording apparatus exemplified in FIG. 32 may be used as a single recording apparatus that records video data and audio data that are input from the outside to a record medium or a recording block that is used for a video camera apparatus together with a camera block having an optical system, an image capturing device, and so forth and that records video data based on a captured image signal to a record medium.

It can be contemplated that there are many types of applicable compression-encoding systems and multiplexing systems. For example, a system defined in the H.264|AVC may be applied for a compression-encoding system of an embodiment of the present invention. Instead, compression-encoding may be performed on the basis of the MPEG2 system. On the other hand, as a multiplexing system, for example, the MPEG2 systems may be used. In the following, it is assumed that video data are compression-encoded on the basis of a system prescribed in the H.264|AVC and video data and audio data are multiplexed on the basis of a system prescribed in the MPEG2 systems.

A control section 30 is composed of, for example, a CPU (Central Processing Unit), a RAM (Random Access Memory), a ROM (Read Only Memory), and so forth (not shown). The control section 30 controls each section of a recording section 10 of the recording apparatus using the RAM as a work memory on the basis of a program and data stored in the ROM. In FIG. 32, lines that connect the control section 30 and each section of the recording section 10 are omitted to prevent the drawing from becoming complicated.

The file system used in the recording apparatus is provided by a program that operates on the control section 30. For example, the control section 30 associates a physical address of data recorded on the record medium 20 with a file that stores the data on the basis of the file system. In addition, the control section 30 creates logical management information of a file in which each type of data is stored. The structure of the directory shown in FIG. 5 is an example of logical management information of a file. The creation of a new file and file open and close are controlled by the control section 30 based on the file system.

A UI (User Interface) section 31 has operation switches with which the user operates the recording apparatus and that outputs control signals according to the operations of the operation switches. The control signals are supplied to the control section 30. The control section 30 controls the operation of each section of the recording section 10 with processes of software performed on the basis of the control signals supplied from the UI section 31 according to the user's operation. For example, the control section 30 controls the record start and stop operations of the recording apparatus according to operations for the UI section 31.

Base band digital video data are input from a terminal 40. As the digital video data are input, base band digital audio data are input from a terminal 41.

The digital video data are input from the terminal 40 to the recording section 10 and supplied to a video encoder 11. The video encoder 11 compression-encodes the supplied digital video data according to the predetermined system. In this example of which compression-encoding is performed on the basis of the system prescribed in the H.264|AVC, intra-frame compression is performed, for example, using DCT (Discrete Cosine Transform) and intra-screen prediction with a moving vector. In addition, entropy encoding is performed to improve the compression efficiency. Digital video data that have been compression-encoded by the video encoder 11 are supplied as an H.264|AVC elementary stream (ES) to a multiplexer (MUX) 13.

Digital audio data are input from the terminal 41 to the recording section 10 and supplied to an audio encoder 12. The audio encoder 12 compression-encodes the supplied digital audio data according to the predetermined compression-encoding system, for example, AC3 (Audio Code number 3) system. The compression-encoding system for audio data is not limited to AC3. Instead, base band audio data are contemplated to be used without compression-encoding audio data. The digital audio data that have been compression-encoded are supplied to the multiplexer 13.

The multiplexer 13 multiplexes the digital video data and digital audio data, which have been compression-encoded and provided, according to the predetermined system and outputs the multiplexed data as one data stream. In this example of which multiplexing is performed on the basis of the MPEG2 systems, the provided compressed video data and audio data are multiplexed on the time division basis using an MPEG2 transport stream. For example, the multiplexer 13 has a buffer memory. The multiplexer 13 stores the compressed video data and audio data that have been supplied in the buffer memory.

In the H.264|AVC system, video data are encoded by interframe compression using inter-frame correlation in a decode unit on the basis of a position at which decoding can be started. This decode unit is, for example, a GOP. Video data stored in the clip AV stream file needs to match the boundary of the decode unit. Thus, the multiplexer 13 creates TS packets according to the boundary of the decode unit.

The compressed video data stored in the buffer memory are PES (packetized Elementary Stream) packetized by dividing them in a predetermined size and adding a header to each divided portion. Likewise, the compressed audio data are PES packetized by dividing them in a predetermined size and adding a header to each divided portion. The header stores predetermined information prescribed in the MPEG2 systems, such as a PTS that represents the reproduction time of data stored in the packet and a DTS (Decoding Time Stamp) that represents the decode time. The PES packets are further divided and stored in the payload of transport packets (TS packets). A header of each TS packet stores a PID (Packet Identification) that identifies data stored in the payload.

The multiplexer 13 adds a header having a predetermined size to each TS packet and outputs the resultant TS packets. A packet to which the predetermined header is added to each TS packet is referred to as a source packet. Each source packet is assigned a source packet number that identifies itself and that represents its order. The source packet number can be stored, for example, in the header added to each TS packet. Source packets that are output from the multiplexer 13 are temporarily stored in the stream buffer 14.

A recording control section 15 controls recording of data to the record medium 20. As the record medium 20, for example, a recordable type DVD (Digital Versatile Disc) may be used. Instead, as the record medium 20, a hard disk drive may be used. Instead, a semiconductor memory may be applied for the record medium 20. A Blu-ray Disc (registered trademark) that accomplishes a larger capacity than other record mediums can be contemplated to be applied for the record medium 20.

The recording control section 15 monitors the amount of data stored in the stream buffer 14. When data stored in the stream buffer 14 becomes equal to or larger than the predetermined amount, data are read from the stream buffer 14 for the amount of the record unit of the record medium 20 and written to the record medium 20. Data are written to the record medium 20 such that they are continuously and additionally written to a predetermined file in the unit of a source packet under the control of the control section 30 based on the file system.

A management information processing section 16 is composed of, for example, a CPU, a RAM as a work memory, and a ROM that pre-stores a program and predetermined data (these sections are not shown). Instead, the management information processing section 16 can accomplish its function as a program process of, for example, the control section 30. In this case, for example, the RAM of the control section 30 is used as a volatile memory 17 and a nonvolatile memory 18 is connected to the control section 30.

The management information processing section 16 uses the volatile memory 17 as a work memory on the basis of record data and creates information to be stored in the foregoing index file "index.bdmv", movie object file "MovieObject.bdmv", play list file "xxxxx.mpls", and clip information file "zzzzz.clpi". The created information is written to the record medium 20 at a predetermined timing.

For example, the management information processing section 16 obtains time information of the record data from the multiplexer 13 and address information of the record data for the record medium 20 from the recording control section 15 and creates EP entry information based on the obtained these time information and address information. In addition, the play list file "xxxxx.mpls" is created or updated and the clip information file "zzzzz.clpi" is created on the basis of a control signal that is output from the control section 30 according to the record start operation or the record stop operation for the UI section 31 and information about the record data supplied from the multiplexer 13 and the recording control section 15. In addition, when recording is newly performed for the record medium 20, the index file "index.bmv" and the movie object file "MovieObject.bdmv" are created or updated.

Figure 33:
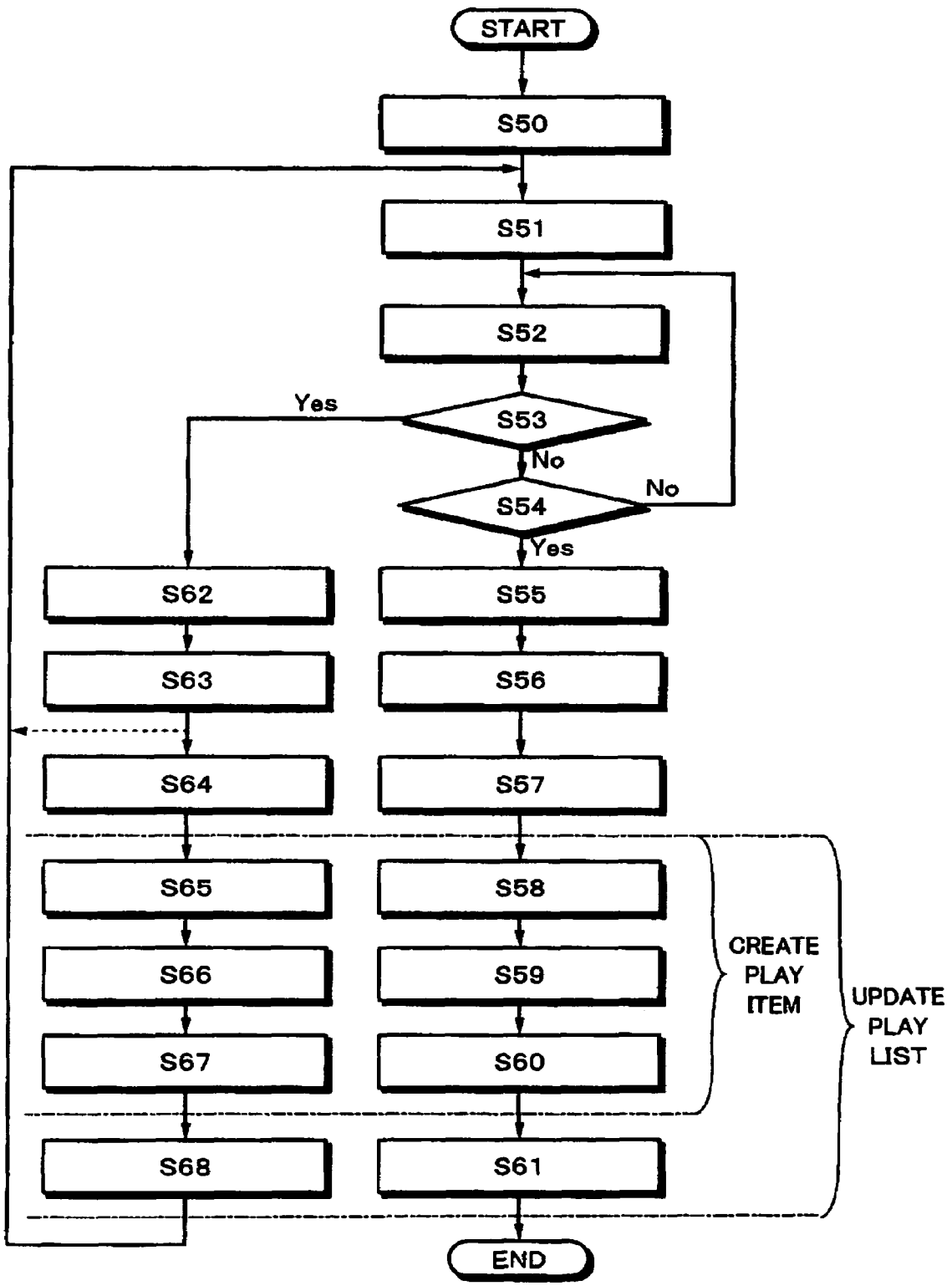
FIG. 33 is a flow chart showing an example of a recording method according to an embodiment of the present invention.

Next, a clip recording control according to an embodiment of the present invention will be described. FIG. 33 is a flow chart showing an example of a recording method according to an embodiment of the present invention. In this embodiment, information of a clip that is newly recorded is successively additionally written to a play list that exists. Before the processes of the flow chart, it is assumed that a play list file, an index file, and a movie object file have been recorded on the record medium 20.

The record start operation is performed at step S50. At the next step S51, a clip AV stream file is newly created under the control of the control section 30. For example, the file system sets the logical structure of the clip AV stream file that is newly created and associates the clip AV stream file with a physical address on the record medium 20. At the next step S52, the recording of a clip AV stream corresponding to the clip AV stream file created at step S51 is started.

The record start operation is performed, for example, as follows. For example, the UI section 31 is provided with a record start switch for a record start command and a record stop switch for a record stop command. At step S50, the user operates the record start switch. According to this operation, a control signal for the record start command is output from the UI section 31 and supplied to the control section 30. Based on the control signal for the record start command, the control section 30 controls each section of the recording section 10 to record base band video data that are input from the terminal 40 and base band audio data that are input from the terminal 41 to the clip AV stream file.

As an example of record start control of the control section 30, it can be contemplated that in the record stop state the operations of the video encoder 11 and the audio encoder 12 are stopped and the operations of the video encoder 11 and the audio encoder 12 are started according to the record start command. Instead, by starting and stopping the operations of the multiplexer 13 and the stream buffer 14, the record start and stop control can be performed.

According to the record start control, the clip AV stream is recorded to the clip AV stream file on the record medium 20 (at step S52). In other words, the input video data and audio data are compression-encoded by the video encoder 11 and the audio encoder 12, respectively, packetized by the multiplexer 13 as source packets of which a predetermined header is added to each TS packet, and then supplied to the stream buffer 14. When the amount of source packets stored in the stream buffer 14 becomes equal to or larger than a predetermined amount, the record controlling section 15 reads the source packets from the stream buffer 14. The source packets that have been read are successively recorded to the record medium 20 on the basis of an address on the record medium 20 associated with the clip AV stream file assigned a file name in a predetermined manner.

The file name of the clip AV stream file newly created is selected such that the file name is not redundant to those of other clip AV stream files recorded on the record medium 20.

As the clip AV stream is recorded to the record medium 20, EP entry information that represents the relationship between the reproduction time and address (logical address of the clip AV stream file) of data that are corded is created by the management information processing section 16 in real time. This data are also stored in the volatile memory 17 as data stored in the block blkEPMap( ) in the foregoing clip information file "zzzzz.clpi". As a backup of the data, the same data can be also stored in the nonvolatile memory 18.

At the next step S53, it is determined whether or not the file size of the clip AV stream file that is currently being recorded exceeds, for example, 2 GB. For example, the control section 30 always monitors the file size of the clip AV stream file that is currently being recorded. For example, when the next source packet has been read from the stream buffer 14 and recorded to the clip AV stream file, the control section 30 determines whether or not the file size of the clip AV stream file exceeds a predetermined size.

As a more specific example, the control section 30 monitors the processes of the multiplexer 13 and cumulates the capacity of source packets that are output from the multiplexer 13 from the source packet stored at the beginning of the clip AV stream file. Based on this cumulated value, the control section 30 determines whether or not the data amount exceeds the predetermined value with the next source packet that is output from the multiplexer 13.

As described above, the clip AV stream file is recorded corresponding to the boundary of the decode unit based on the position at which decoding can be started. Thus, the determination at step S53 is specifically performed in the decode unit. For example, the control section 30 determines whether or not the file size of the clip AV stream file exceeds the predetermined size when the next source packet in the decode unit is read from the stream buffer 14 and it has been recorded to the clip AV stream file.

When determined at step S53 that the file size of the clip AV stream file exceed the predetermined size with the next source packet recorded to the clip AV stream file, the flow of the process advances to step S62 that will be described later. At this point, the control section 30 stores, for example, the source packet number of the next source packet with which the file size of the clip AV stream file exceeds the predetermine size.

In contrast, when determined at step S53 that the file size of the clip AV stream file do not exceed the predetermined size with the next source packet recorded to the clip AV stream file, the flow of the process advances to step S54. At step S54, it is determined whether or not the record stop operation has been performed. For example, when the user has operated the record operation switch disposed in the UI section 31 and it has been determined that the recording have been stopped, the flow of the process advances to step S55. In contrast, when determined that the recording have not been stopped, the flow of the process returns to step S52. At step S52, the recording of the clip AV stream to the record medium 20 is continued. The loop processes based on the determined results at step S53 and step S54 are performed, for example, whenever a source packet is output from the multiplexer 13.

At step S55, as the recording is stopped, all the stream stored in the stream buffer 14 is written to the record medium 20. For example, the record controlling section 15 reads all the stream (source packets) stored in the stream buffer 14 according to the record stop command from the control section 30 and writes the stream to the clip AV stream file that is currently being recorded to the record medium 20. At the next step S56, the clip AV stream file is closed on the file system.

According to the record stop command, the operations, for example, of the video encoder 11 and the audio encoder 12 are stopped. At this point, to perform the first seamless connection described with reference to FIG. 13A, for example, the video encoder 11 and the audio encoder 12 are controlled such that the operation of the audio encoder 12 is stopped a predetermined time period after the operation of the video encoder 11 is stopped.

In the next step S57 to step S61, a clip information file with respect to the clip AV stream file written to the record medium 20 is created and the play list file is updated.

First of all, at step S57, the management information processing section 16 creates the clip information file "zzzzz.clpi" corresponding to the clip AV stream file closed at step S56. The file name of the clip information file is the file name corresponding to the file name of the clip AV stream file created at step S51. When the file name of the clip AV stream file is "zzzzz.m2ts", the file name of the clip information file is "zzzzz.clpi" that is the same as the file name of the clip AV stream file except for the extension.

The values of fields and flags of the clip information file "zzzzz.clpi" are set and stored according to syntax exemplified in FIG. 15 to FIG. 21. For example, information with respect to source packets and reproduction time (PTS) are created by the management information processing section 16 on the basis of information obtained from the multiplexer 13 while a clip is being recorded. On the other hand, information with respect to record addresses on the record medium 20 is created by the management information processing section 16 on the basis of information obtained from the record controlling section 15 while the clip is being recorded. The characteristic values of the system are based on information pre-stored, for example, in the ROM (not shown). In addition, information of the foregoing block blkEPMap( ) that represents the relationship between reproduction times and addresses is stored in the block blkCPI( ) of the clip information file "zzzzz.clpi".

When the recording of a clip is stopped by the user's operation, the value of the flag IsCCT in the block blkClipInfo( ) becomes "1" (binary value). Accordingly, data represented with the if statement in the block blkCliInfo( ) (refer to FIG. 16) is set in a predetermined manner.

After the clip information file has been created, the flow of the process advances to the next step S58. The processes from step S58 to step S61 are processes with respect to a play list file. By the processes from step S58 to step S61, a play item corresponding to the clip AV stream file "00002.m2ts" that has been newly recorded is added to the play list file that exists on the record medium 20.

First of all, at step S58, the value of the field ConnectionCondition of the block blkPlayItem( ) in the play list file is set to "5" that denotes that the clip AV stream file "00002.m2ts" is connected to the clip AV stream file that is recorded next by the first seamless connection (refer to FIG. 12). At the next step S59, the value of the field NumberOfPlayItems of the play item file is incremented by "1" that denotes that one play item has been added to the play list (refer to FIG. 11).

At the next step S60, the field ClipInformationFielName, the field INTime, and the field OUTTime of the block blkPlayItem( ) are set and the block blkPlayItem( ) that is added as the clip is recorded is created. The field ClipInformationFileName stores the file name "zzzzz.clpi" of the clip information file created at the foregoing step S55. Specifically, since the extension of the clip information file is fixed, the file name "zzzzz" followed by the period is stored. The field INTime and the field OUTTime are information that represents the start time and end time of a video stream stored in the corresponding clip AV stream file "00002.m2ts" and that is based on, for example, information of the block blkEPMap( ) of the block blkCPI( ) in the clip information file "zzzzz.clpi".

At the next step S61, the value of the field NumberOfPlayListMarks of the block blkPlayListMark( ) in the play list file is incremented by "1" and thereby the value of the field MarkTimeStamp added in the for loop statement is set to the value of the field INTime in the block blkPlayItem( ) that has been set at the foregoing step S60. In other words, a play list mark is placed at the time corresponding to the beginning of the clip AV stream that has been newly recorded.

In such a manner, the clip information file "zzzzz.clpi" is created corresponding to the newly recorded clip AV stream file "zzzzz.m2ts" and the existing play list file is updated.

When the record start operation is performed for the UI section 31 in the record stop state, the processes are started from step S50 again. In other words, the new clip AV stream file is recorded to the record medium 20, the determination based on the file size of the clip AV stream file is performed, the corresponding clip information file is created, a play item that refers to the created clip information file is created, and the addition process of the created play item to the play list is performed in the foregoing manner.

The writing process at the foregoing step S55 for data stored in the stream buffer 14 to the record medium 20 may be performed after the process of step S61.

Next, a process performed when a clip AV stream file is divided due to the restriction of the system based on the determined result at the foregoing step S53 according to an embodiment of the present invention will be described. When determined at the foregoing step S53 that the file size of the clip AV stream file exceed the predetermined size with the next source packet recorded to the clip AV stream file, the flow of the process advances to step S62. At step S62, the stream stored in the stream buffer is written to the clip AV stream file "zzzzz.m2ts".

At this point, a stream preceded by the next source packet with which the file size of the clip AV stream file "zzzzz.m2ts" exceeds the predetermined size, namely a stream stored in the stream buffer before the next source packet, is written to the clip AV stream file "zzzzz.m2ts" based on the source packet number stored in the control section 30 when the determination has been performed at step S53.

At the next step S63, the clip AV stream file that is currently being recorded is closed by the file system. When the file is closed, the flow of the process advances to step S64. At step S64, the clip information file "zzzzz.clpi" corresponding to the clip AV stream file created at step S51 is created by the management information processing section 16 in the same manner as described in the process at step S57.

At the next step S65, the value of the field ConnectionCondition of the block blkPlayItem( ) in the play list file is set to "6" that denotes that the clip AV stream file "zzzzz.m2ts" is connected to the next recorded clip AV stream file by the second seamless connection (refer to FIG. 12).

At step S66, the value of the field NumberOfPlayItems of the play list file is incremented by "1" that denotes that one play item is added to the play list (refer to FIG. 11). Thereafter, at step S67, the field ClipInformationFileName in the block blkPlayItem( ) is set, the field INTime and the field OUTTime are set on the basis of information of the block blkEPMap( ) of the block blkCPI( ) in the clip information file, and the block blkPlayItem( ) that is added as the clip is recorded is created.

At the next step S68, the value of the field NumberOfPlayListMarks of the block blkPlayListMark in the play list file is incremented by "1" and thereby the value of the field MarkTimeStamp added in the for loop statement is set to the value of the field INTime of the block blkPlayItem( ) that has been set at the foregoing step. In other words, a play list mark is placed at the beginning of the clip that has been newly recorded.

After the process of step S68 has been completed, the flow of the process returns to step S51. At step S51, a clip AV stream file is newly created. The clip AV stream file created at step S51 after the determination at step S53 is a file in which source packets are successively stored from the next source packet determined at step S53 that with which the file size of the file exceeds the predetermined size.

In this case, the clip AV stream file created this time and the clip AV stream file created the last time are formed such that video data and audio data are become continuous. For example, with respect to audio data, the recording is controlled such that the time of the last end of audio data recorded in the clip AV stream file created the last time matches the time of the beginning of audio data recorded in the clip AV stream file created this time. For example, the control section 30 controls the audio encoder 12, the multiplexer 13, and the stream buffer 14 in a predetermined manner to control such recording.

In the foregoing, after the process of step S68, the flow of the process returns to step S51 to newly create a clip AV stream file. However, this method is just exemplary. In other words, when a clip AV stream file is divided according to the determined result of step S53 based on the restriction of the system, since the divided clip AV stream files are connected by the second seamless connection, it is preferred that the time after the file is closed at step S63 until a new clip AV stream file is created be as short as possible.

Thus, it can be contemplated that immediately after the clip AV stream file is closed at step S63, the flow returns to step S51 to newly create a clip AV stream file. In this case, the processes from step S64 to step S68 are performed in parallel with the process of newly creating a clip AV stream file. The play list file and the clip information file created at step S63 are temporarily stored in the volatile memory 17 and/or the nonvolatile memory 18.

The process of setting a play list mark at the foregoing step S61 and step S68 can be omitted when a clip AV stream file that is newly created according to the record start operation at step S50 is divided on the basis of the restriction of the system unless the clip AV stream file is divided first time. For example, it can be contemplated that a play list mark corresponding to the beginning of a clip AV stream file connected by the second seamless connection is omitted. Instead, when the record stop operation is performed, a play list mark may be set to the time at which the recording is started by the record start operation corresponding to the record stop operation.

Figure 34:
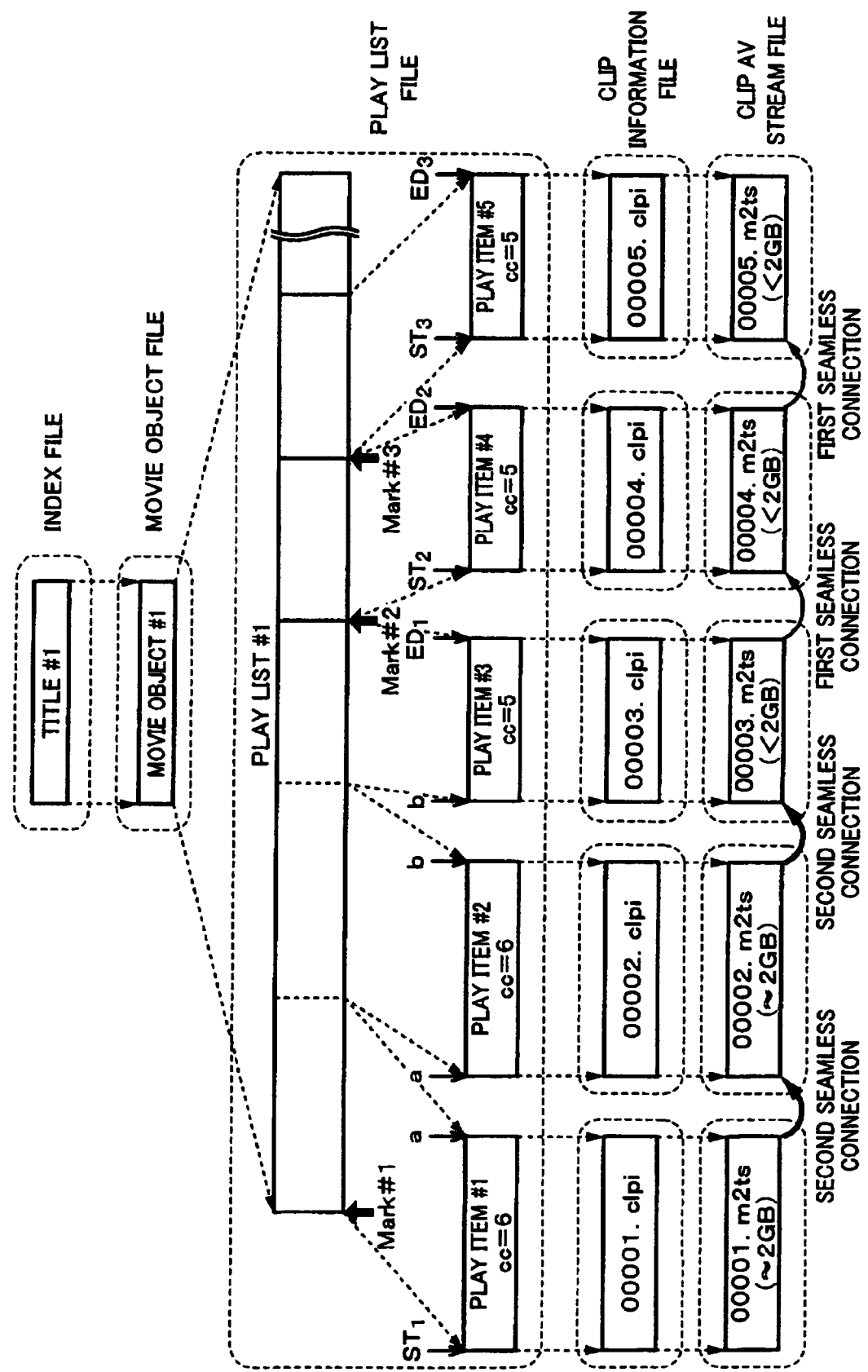
FIG. 34 is a schematic diagram showing an example of the structure of files recorded by a method according to an embodiment of the present invention.

FIG. 34 shows an example of the structure of files created according to the procedure shown in FIG. 33. For example, it is assumed that recording has been performed with time elapse as shown in FIG. 35A. In other words, with reference to FIG. 35A, the record start operation for recording to the record medium 20 is performed at time $ST_1$, the corresponding record stop operation is performed at time $ED_1$, and thereby recording is performed for a record region 400. In addition, the record start operation for recording to the same record medium 20 is performed at time ST2 later than time $ED_1$, the record stop operation is performed at time $ED_2$, and thereby recording is performed for a record region 401. Likewise, the record start operation for recording to the same record medium 20 performed at time $ST_3$ later than time $ED_2$, the record stop operation is performed at time $ED_3$, and thereby recording is performed for a record region 402.

In this case, it is assumed that the record duration corresponding to the predetermined size (for example 2 GB) that has been set as the upper limit of the file size of a clip AV stream file is represented, for example, by the length shown in FIG. 35B. In this case, in the record region 400, the recording is performed for the duration corresponding to the predetermined size of 2 GB from record start time $ST_1$ to time a and the recording is performed for the duration corresponding to the predetermined size from time a to time b. However, the record duration from time b to record stop time $ED_1$ is smaller than the duration corresponding to the predetermined size.

On the other hand, the record region 401 and the record region 402 each are smaller than the duration corresponding to 2 GB as the upper limit of the file size.

Next, the processes shown in FIG. 33 will be specifically described in the case that recording is performed with time elapse shown in FIG. 35A with reference to the flow chart shown in FIG. 33 and the structure of files shown in FIG. 34.

When the record start operation is performed at time $ST_1$, the flow of the process advances to step S51. At step S51, a clip AV stream file "00001.m2ts" is created. A stream is recorded to the created clip AV stream file "00001.m2ts". The file size of the clip AV stream file "00001.m2ts" is checked, for example, in the unit of a source packet by the control section 30 and it is determined whether or not the file size exceeds the predetermined size. Specifically, as described above, the determination is performed on the basis of the result of which the data amount of source packets is cumulated. In the example shown in FIG. 35A, when the next source packet is recorded immediately before time a, it is determined that the file size of the clip AV stream file "00001.m2ts" exceed the predetermined size.

Thereafter, the flow of the process advances to step S62. At step S62, the stream stored in the stream buffer is read in a predetermined manner and written to the clip AV stream file "00001.m2ts". At step S63, the clip AV stream file "00001.m2ts" is closed and the corresponding clip information file "00001.clpi" is created (at step S64). Instead, as described above, after the clip AV stream file "00001.m2ts" is closed, in parallel with the processes after step S64, the flow of the process may return to step S51 to create the next clip AV stream file.

From the next step S65, play item #1 that refers to the clip AV stream file "00001.m2ts" is created and play list #1 is updated. First of all, the value of the field ConnecCondition in play item #1 is set to "6" that represents the second seamless connection (at step S65) and play item #1 is created such that the field INTime and the field OUTTime are time $ST_1$ and time a, respectively, on the basis of the clip information file "00001.clpi" (at step S66). The play item #1 is described in play list #1. In addition, the value of the field MarkTimeStamp is set to the value of the field INTime, namely time $ST_1$, and play list mark Mark#1 is set.

Thereafter, the flow of the process returns to step S51. At step S51, to record the stream from time a, a clip AV stream file "00002.m2ts" is newly created. The stream is recorded to the clip AV stream file "00002.m2ts" (at step S52).

At this point, as described above, in play item #1 corresponding to the clip AV stream file "00001.m2ts" created and recorded the last time, the value of the field ConnectionCondition is set to "6" that represents the second seamless connection. Thus, record control is performed such that audio data recorded in the clip AV stream file "00001.m2ts" recorded the last time and audio data recorded in the clip AV stream file "00002.m2ts" created this time are continuously reproduced. For example, record control is performed such that the time of the last end of audio data recorded in the clip AV stream file "00001.m2ts" matches the time of the beginning of the clip AV stream file "00002.m2ts".

Thereafter, at step S53, it is determined whether or not the file size of the clip AV stream file "00002.m2ts" exceeds the predetermined size. In the example shown in FIG. 35A, when the next source packet is recorded immediately before time b, it is determined that the file size of the clip AV stream file "00002.m2ts" exceed the predetermined size. In this case, the flow of the process advances to step S62. In the same manner as described above, the stream stored in the stream buffer is written to the clip AV stream file "00002.m2ts" (at step S62) and then the clip AV stream file "00002.m2ts" is closed (at step S63). Thereafter, a clip information file "00002.clpi" corresponding to the clip AV stream file "00002.m2ts" is created (at step S64).

Thereafter, the field ConnectionCondition of play item #2 corresponding to the clip information file "00002.clpi" is set to "6" that represents the second seamless connection (at step S65). At the next step S66, play item #2 is created in a predetermined manner such that the field INTime and the field OUTTime are time a and time b, respectively, and additionally written to play list #1. Thereafter, at step S68, a play list mark that represents the value of the field INTime, namely time a, is set. In this case, the process of setting a play list mark can be omitted.

Thereafter, the flow of the process returns to step S51 again. At step S51, to record the stream from time b, a clip AV stream file "00003.m2ts" is newly created. The stream is recorded to the clip AV stream file "00003.m2ts" (at step S52).

In this case, as described above, in play item #1 corresponding to the clip AV stream file "00001.m2ts" created and recorded the last time, the value of the field ConnectionCondition is set to "6" that represents the second seamless connection. Thus, as described above, record control is performed such that, for example, the time of the last end of audio data recorded in the clip AV stream file "00002.m2ts" matches the time of the beginning of the clip AV stream file "00003.m2ts".

Next, at step S53, it is determined whether or not the file size of the clip AV stream file "00003.m2ts" exceeds the predetermined size. In the example shown in FIG. 35A, before the file size of the clip AV stream file "00003.m2ts" exceeds 2 GB as the upper limit of the file size, the record stop operation is performed at time $ED_1$. Thus, based on the determined result at step S54, the flow of the process advances to step S55. The stream stored in the stream buffer is recorded to the clip AV stream file "00003.m2ts" at step S55, the AV stream file "00003.m2ts" is closed at step S56, and then the corresponding clip information file "00003.clpi" is created at step S57.

Thereafter, the value of the field ConnectionCondition of play item #3 that refers to the clip information file "00003.clpi" is set to "5" that represents the first seamless connection (at step S58). Thereafter, play item #3 is created in a predetermined manner and the play item #3 is additionally recorded to play list file #1 (at step S59 and step S60). In addition, a play list mark can be placed in play list file #1 at the time corresponding to the field INTime of the play item #3 (at step S61). In this case, the process of setting a play list mark can be omitted.

After the record stop operation is performed at time $ED_1$, when the record start operation is performed at time $ST_2$ again (at step S50), a clip AV stream file "00004.m2ts" is newly created at step S51 and the stream is recorded to the clip AV stream file "00004.m2ts" (at step S52). In the example shown in FIG. 35A, before the file size of the clip AV stream file "0000.m2ts" exceeds the predetermined size, the record stop operation is performed at $ED_2$. Thus, based on the determined result at step S54, the flow of the process advances to step S55.

At step S55, the stream stored in the stream buffer is recorded to the clip AV stream file "00004.m2ts", the AV stream file "00004.m2ts" is closed at step S57, and the corresponding clip information file "00004.clpi" is created at step S57. At step S58, the value of the field ConnectionCondition of play item #4 that refers to the clip information file "00004.clpi" is set to "5" that represents the first seamless connection. Thereafter, play item #4 is created in a predetermined manner and the play item #4 is additionally recorded to play list #1 (at step S59 and step S60). In addition, a play list mark Mark#2 is set to play list #1 at the time corresponding to the field INTime of play item #4 (at step S61).

Since the process performed from the next record start time $ST_3$ to record stop time $ED_3$ shown in FIG. 35A are the same as that performed from the foregoing record start time $ST_2$ to record stop time $ED_2$, to prevent redundancy, the description will be omitted.

As the first clip AV stream file "00001.m2ts" is recorded, a movie object file that describes movie object #1 that calls play list #1 and an index file that selects and reproduces movie object #1 as title #1 can be created. A movie object file and an index file can be created by updating their templates that have been created. Since the creation of a movie object file and an index file less relates to the spirit of the present invention, their detailed description will be omitted.

Next an example of the reproduction of a clip AV stream file that has been recorded to the record medium 20 described with reference to FIG. 34 and FIG. 35A will be described in brief. In this example, it is assumed that the record medium 20 is a recordable type DVD. When the record medium 20 is loaded into the reproducing apparatus, an index file is read from the record medium 20 and then a movie object file is read therefrom. When title #1 is commanded to be reproduced in the index file, the corresponding movie object #1 is referred in the movie object file and a play list file that describes play list #1 is read from the record medium 20.

Play item #1, play item #2, play item #3, play item #4, and so forth are continuously reproduced according to play list #1. The clip information file "00001.clpi" is referred from play item #1, the clip AV stream file "0001.m2ts" is reproduced, the clip information file "00002.clpi" is referred from play item #2 according to the description of play list #1, and the clip AV stream file "00002.m2ts" is reproduced.

Since the value of the field ConnectionCodition of play item #1 is "6" that represents the second seamless connection, the clip AV stream file "00001.m2ts" and the clip AV stream file "00002.mts" are seamlessly connected and reproduced. At this point, since record control is performed for audio data such that the time of the last end of the clip AV stream file "00001.m2ts" matches the time of the beginning of the clip AV stream file "00002.m2ts", audio of the clip AV stream file "00001.m2ts" and audio of the clip AV stream file "00002.m2ts" are reproduced as continuous audio.

According to the description of play list #1, after play item #2, play item #3 is reproduced. In other words, the clip information file "00003.clpi" is referred from play item #3 and the clip AV stream file "00003.m2ts", is reproduced.

Since the value of the field ConnectionCodition of play item #2 is "6" that represents the second seamless connection, the clip AV stream file "00002.m2ts" and the clip AV stream file "00003.m2ts" are seamlessly connected and reproduced. Likewise, in this case, since record control is performed for audio data such that the time of the last end of the clip AV stream file "00002.m2ts" matches the time of the beginning of the clip AV stream file "00003.m2ts", audio of the clip AV stream file "00002.m2ts" and audio of the clip AV stream file "00003.m2ts" are reproduced as continuous audio.

Thus, the clip AV stream files "00001.m2ts", "00002.m2ts", and "00003.m2ts" that have been recorded as three divided files each having a predetermined size from record start time $ST_1$ to record stop time $ED_1$ in the continuously recorded region 400 (refer to FIG. 35A) are continuously reproduced as if they were video data and audio data recorded in one continuously clip AV stream file without causing the user to recognize the division of the file.

On the other hand, the clip AV stream file "00003.m2ts" that has been recorded according to the record start operation at time $ST_2$ after the record stop operation at time $ED_1$ is reproduced on the basis of play item #4 after the reproduction of the foregoing play item #3 according to play list #1. At this point, the value of the field ConnectionCondition of play item #3 has been set to "5" that represents the first seamless connection. Thus, in play item #3, audio data have been recorded slightly longer than video data at the last end of the clip AV stream file "00003.m2ts".

For example, desired sound effects such as fade-out are added to this portion, the resultant data are mixed with audio data of the beginning of the clip AV stream file "00004.m2ts" corresponding to the next play item #4, and the clip AV stream file "00003.m2ts" and the clip AV stream file "00004.m2ts" are continuously reproduced. In such a manner, two clip AV stream files of different scenes can be seamlessly reproduced with suppression of a sense of discomfort.

Next, another embodiment of the present invention will be described. In the foregoing, an example of which the present invention is applied to a single recording apparatus (refer to FIG. 32) was described. In contrast, in the other embodiment, the present invention is applied to a video camera apparatus that has an image capturing device and an optical system that inputs light emitted from a subject to the image capturing device and that records video data to a record medium based on a captured image signal captured by the image capturing device.

FIG. 36 shows an example of the structure of a video camera apparatus 100 according to the other embodiment of the present invention. Since the structure of the recording apparatus described with reference to FIG. 32 can be nearly applied for the structure of the recording system of the video camera apparatus 100, sections that are in common with those shown in FIG. 32 are designated by the same reference numerals and their detailed description will be omitted.

In the structure shown in FIG. 36, a camera section 50 has an optical system 51, an image capturing device 52, a captured image signal processing section 53, a camera control section 54, and a display section 55 as a structure with respect to a video signal. The camera section 50 has a microphone (MIC) 56 and an audio signal processing section 57 as a structure with respect to an audio signal. By exchanging various types of control signals and information with each section of the camera section 50, the control section 30 controls the operation of the camera section 50. In addition, the control section 50 controls the operations of the camera section 50 on the basis of control signals supplied from the UI section 31 according to user's operations.

When structured as the video camera apparatus 100, the record start operation and the record stop operation are normally performed, for example, such that a single record switch disposed in the UI section 31 is used and whenever the record switch is pressed, the record start command and the record stop command are alternately issued. In this video camera apparatus 100, a disc record medium such as a Blu-ray Disc or a recordable type DVD is applied for the record medium 20.

Of course, instead, a hard disk drive (not shown) may be built in the video camera apparatus 100. This hard disk drive may be used as the record medium 20. Instead, a nonvolatile semiconductor memory having a capacity for data for a predetermined continuous record duration may be built in or attachably/detachably disposed in the video camera apparatus 100 and the nonvolatile memory can be used as the record medium 20.

In the camera section 50, the optical system 51 has a lens system that guides light from a subject to the image capturing device 52, a diaphragm adjustment mechanism, a focus adjustment mechanism, a zoom mechanism, a shutter mechanism, and so forth. The operations of the diaphragm adjustment mechanism, the focus adjustment mechanism, the zoom mechanism, and the shutter mechanism are controlled by the camera control section 54 on the basis of control signals supplied from the control section 30.

The image capturing device 52 is composed, for example, of a CCD (Charge Coupled Device). The image capturing device 52 converts light emitted through the optical system 51 into an electric signal by the photoelectric conversion, performs predetermined signal processes for the electric signal, and outputs the resultant signal as a captured image signal. The captured image signal processing section 53 performs predetermined signal processes for the captured image signal that is output from the image capturing device and outputs the resultant signal as base band digital video data.

For example, the captured image signal processing section 53 causes a CDS (Correlated Double Sampling) circuit to sample only a signal that has image information of the captured image signal that has been output from the image capturing device 52 and remove noise from the sampled signal, and causes an AGC (Auto Gain Control) circuit to adjust the gain of the signal. Thereafter, the captured image signal processing section 53 converts the gain adjusted signal into a digital signal by the A/D conversion. In addition, the captured image signal processing section 53 performs a detection signal process for the digital signal, extracts components of colors of R (red), G (green), and B (blue) from the digital signal, performs processes such as γ correction, white balance correction, and so forth, and finally outputs the resultant signal as digital video data of one base band.

In addition, the captured image signal processing section 53 supplies information about the captured image signal that has been output from the image capturing device 52 to the control section 30. The control section 30 generates control signals for controlling the optical system 51 on the basis of the information and supplies the control signals to the camera control section 54. The camera control section 54 controls the focus adjustment mechanism, the diaphragm adjustment mechanism, and so forth on the basis of the control signals.

In addition, the captured image signal processing section 53 generates an image signal that causes the display section 55 that uses, for example, an LCD (Liquid Crystal Display) as a display device to display an image on the basis of the captured image signal that has been output from the image capturing device 52.

On the other hand, the microphone 56 collects a surrounding sound, converts it into an electric signal, and outputs the electric signal. An audio signal that has been output from the microphone 56 is supplied to the audio signal processing section 57. The audio signal processing section 57 performs the A/D conversion for the supplied audio signal through a limiter, performs predetermined audio signal processes such as noise reduction and sound quality correction for the digital audio data and outputs the resultant data as base band digital audio data.

The base band digital video data that have been output from the captured image signal processing section 53 of the camera section 50 are supplied to the terminal 40 of the recording section 10. On the other hand, the base band digital audio data that have been output from the audio signal processing section 57 are supplied to the terminal 41 of the recording section 10.

When the record switch disposed in the UI section 31 is pressed in the record stop state, a control signal that is a record start command is supplied from the UI section 31 to the control section 30. According to the control signal, the base band digital video signal and digital audio data that have been output from the camera section 50 are started to be recorded to the record medium 20 under the control of the control section 30.

In other words, as described above, the operations of the video encoder 11 and the audio encoder 12 are started under the control of the control section 30. The video data and audio data are compression-encoded by the video encoder 11 and the audio encoder 12, respectively, and packetized and multiplexed in a predetermined manner as AV stream data by the multiplexer 13. The AV stream data are supplied to the recording control section 15 through the stream buffer 14 and recorded as a clip AV stream file to the record medium 20.

When recording is continuously performed for the predetermined duration or more after the record start operation is performed and the file size of the clip AV stream file exceeds the predetermined size, as described above, the clip AV stream file that is being recorded is closed, the corresponding clip information file is created, and a play item that refers to the clip information file is created. The created play item represents the second seamless connection. The created play item is added to the play list. In addition, a clip AV stream file is newly created and AV stream data that are continuously supplied are recorded to the newly created clip AV stream file.

When the record switch of the UI section 31 is pressed, the recording is stopped, a clip information file is created and the play list file is updated. The management information processing section 16 creates a clip information file corresponding to a clip AV stream file recorded to the record medium 20 on the basis of information supplied from the multiplexer 13 and the recording control section 15. In addition, the management information processing section 16 creates a play item that refers to the clip information file. When a play list exists, the management information processing section 16 adds the created play item to the play list and places a play list mark to the play list.

When the record switch is pressed again in this state, the record start command is issued again and the recording of the new clip AV stream file to the record medium 20 is started. In addition, processes, for example, of creating a play item that refers to the clip information file and adding the created play item to the play list are performed. The clip AV stream files are connected by the first seamless connection and reproduced.

In this embodiment of which the present invention is applied to the video camera apparatus 100, when continuous image capturing is performed for a long time and the file size of a clip AV stream file recorded after the record start operation until the record stop operation exceeds the predetermined size, the clip AV stream file is automatically divided such that the file size of one file does not exceed the predetermined size. In addition, upon dividing, the second seamless connection is set as the connection method for the divided clip AV stream files. Thus, upon reproducing, video data and audio data recorded in one time continuous image capturing can be continuously reproduced without recognizing the division of the clip AV stream file on the basis of the predetermined size.

In the foregoing, an example of which the determination of whether or not a clip AV stream file was divided is performed on the basis of the file size was described. This determination method is just exemplary. In other words, the determination of whether or not a file is divided can be contemplated to be performed on the basis of management information for a clip AV stream file. For example, as described above, it is determined whether or not a clip AV stream file is divided on the basis of the upper limit of EP entry information that represents the relationship between address information of the clip AV stream file and time information of video data and audio data recorded in the file.

As described with reference to FIG. 20 to FIG. 23, an EP entry has an entry based on a source packet and an entry based on the PTS. In addition, each entry is composed of a coarse unit search entry and a fine unit search entry. As exemplified in FIG. 22 and FIG. 23, since the number of bits that represents each entry is prescribed in the format, the maximum value that can be represented by the bits corresponds to the maximum number of entries. For example, the control section 30 determines whether or not the number of entry points of the clip AV stream file that is currently being recorded reaches the maximum number based on information with respect to entry points supplied from the management information processing section 16.

For example, with reference to the flow chart shown in FIG. 33, the control section 30 monitors EP entry information created by the management information processing section 16 and determines whether or not the number of EP entries created for one clip AV stream file has become a predetermined number. When determined that the number of EP entries has become the predetermined number, the flow of the process advances to step S62. At step S62, a stream is read from the stream buffer 14 in a predetermined manner, the stream is recorded in the clip AV stream file, and then the clip AV stream file is closed (at step S63). Thereafter, a clip information file corresponding to the clip AV stream file is created (at step S64) and then the value of the field ConnectionCodition in the corresponding play item is set to "6" that represents the second seamless connection (at step S65). Thereafter, at step S66 and step S67, information of a play item is created and the created play item is additionally recorded to the play list. When necessary, at step S68, a play list mark is set.

The determination of whether or not a clip AV stream file is divided may be performed, for example, on the basis of the upper limit of the PTSs instead of the number of EP entries.

In the foregoing, it was described that the recording apparatus shown in FIG. 32 and the recording section 10 of the video camera apparatus 100 shown in FIG. 36 were structured as hardware. However, such a structure is just exemplary. In other words, the recording section 10 may be structured as software. In this case, software is pre-stored, for example, in a ROM (not shown) of the control section 30. Instead, the recording section 10 may be structured on a computer apparatus such as a personal computer. In this case, software that causes the computer apparatus to execute the recording section 10 is recorded to a record medium such as a CD-ROM or a DVD-ROM and supplied therewith. When the computer apparatus can be connected to a network, the software can be provided through the network such as the Internet.

DESCRIPTION OF REFERENCE NUMERALS

10 RECORDING SECTION
11 VIDEO ENCODER
12 AUDIO ENCODER
13 MULTIPLEXER
14 STREAM BUFFER
15 RECORDING CONTROL SECTION
16 MANAGEMENT INFORMATION PROCESSING SECTION
17 VOLATILE MEMORY
18 NONVOLATILE MEMORY
20 RECORD MEDIUM
30 CONTROL SECTION
31 USER INTERFACE SECTION
50 CAMERA SECTION
100 VIDEO CAMERA APPARATUS
S10 OBTAIN LENGTH OF DATA TO BE RECORDED AND SET IT TO VALUE OF ExtDataLength(n+1).
S11 CHECK ExtDataLength AND ExtDataStartAddress OF EACH OF ext_data_entry( )'S LISTED IN CURRENT blkExtensionData( ) AND OBTAIN USE STATE IN DataBlock.
S12 DOES DataBlock HAVE SUCCESSIVE FREE AREA THAT IS EQUAL TO OR LARGER THAN ExtDataLength(n+1).
S13 INCREASE LENGTH VALUE OF blkExtensionData( ) TO CREATE SUCCESSIVE FREE AREA EQUAL TO OR LARGER THAN ExtDataLength(n+1).
S14 DECIDE START ADDRESS OF AREA THAT STORES DATA AND SET IT AS ExtDataStartAddress(n+1).
S15 WRITE DATA HAVING LENGTH OF ExtDataLength (n+1) FROM ADDRESS REPRESENTED BY ExtDataStartAddress(N+1).
S16 ADD ExtDataLength(n+1) AND ExtDataStartAddress (n+1) TO ext_data_entry( )
S20 OBTAIN ExtDataType FROM STANDARD ON WHICH DATA TO BE READ ARE BASED.
S21 OBTAIN ExtDataVersion FROM TYPE OF DATA TO BE READ BASED ON ExtDataType.
S22 READ ext_data_entry( )'S LISTED IN BlkExtensionData( ) ONE BY ONE.
S23 DO ExtDataType AND ExtDataVersion OF BOTH MATCH?
S24 READ ExtDataLength(i) AND ExtDataStartAddress(i).
S25 READ DATA HAVING LENGTH OF ExtDataLength(i) FROM ADDRESS REPRESENTED BY ExtDataStartAddress(i).
S26 HAVE ext_data_entry( )'S BEEN READ?
S27 DATA TRIED TO BE READ DO NOT EXIST.
S50 PERFORM RECORD START OPERATION.
S51 CREATE NEW CLIP AV STREAM FILE.
S52 RECORD STREAM TO CLIP AV STREAM FILE.
S53 2 GB MORE?
S54 RECORD STOP OPERATION?
S55 WRITE STREAM STORED IN STREAM BUFFER TO FILE.
S56 CLOSE CLIP AV STREAM FILE.
S57 CREATE CLIP INFORMATION FILE.
S58 SET ConnectionCondition=5.
S59 INCREMENT NumberOfPlayItems BY 1.
S60 SET ClipInformationFileName, INTime, AND OUTTime AND CREATE blkPlayItem( ).
S61 SET MarkTimeStamp TO INTime AND ADD ONE blkPlayListMark.
S62 WRITE STREAM STORED IN STREAM BUFFER TO FILE.
S63 CLOSE CLIP AV STREAM FILE.
S64 CREATE CLIP INFORMATION FILE.
S65 SET ConnectionCondition=6.
S66 INCREMENT NumberOfPlayItems BY 1.
S67 SET ClipInformationFileName, INTime, AND OUTTime AND CREATE blkPlayItem( ).
S68 (ADD PLAY LIST MARK.)

The invention claimed is:

1. In a recording apparatus which multiplexes video data and audio data and records the resultant data to a record medium, characterized in that
the recording apparatus comprises:
a data input section in which video data and audio data are input;
a record command input section in which a record start command and a record stop command for the video data and the audio data are input;
a recording section which multiplexes the video data and the audio data in a unit of a packet and successively records a multiplexed stream to a stream file on the record medium in the unit of the packet;
a management information creating section which creates a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and
a control section including a central processing unit which controls the recording section and the management information creating section, the control section controls the recording section to start and stop recording of the stream to the stream file according to the record start command and the record stop command to the record command input section, and when information which represents an attribute of the stream file does not satisfy a predetermined restriction with a predetermined unit composed of one or a plurality of the packets recorded to the stream file, the control section controls the recording section to close the stream file, newly create the stream file, and successively record the stream file to the new stream file starting from the predetermined unit, and based on the record stop command to the record command input section, the control section controls the recording section such that reproduction time of beginning of the video data of the stream file matches reproduction time of beginning of the audio data of the stream file and reproduction time of last end of the audio data is later than reproduction time of last end of the video data.

2. In the recording apparatus as set forth in claim 1, characterized in that the control section controls recording of the recording section such that time of last end of the audio data recorded to the stream file which is closed based on the predetermined restriction matches time of beginning of the audio data stored in the new stream file, and the control section controls the recording section to set information which denotes that the video data and the audio data recorded in the closed stream file and the video data and the audio data recorded in the new stream file are continuously reproduced in reproduction region data which represents the closed stream file as a reproduction region and record the reproduction region data to the record medium.

3. In the recording apparatus as set forth in claim 1, characterized in that the attribute of the stream file is a file size, and the predetermined restriction is an upper limit of the file size.

4. In the recording apparatus as set forth in claim 1, characterized in that the attribute of the stream file is entry point information which is stored in the stream information file and which associates information which represents time of the video data stored in the stream file with an address in the stream file, and the predetermined restriction is an upper limit of records of the entry point information which is capable of being stored in the stream information file.

5. In the recording apparatus as set forth in claim 1, characterized in that the attribute of the stream file is information which represents time at which the video data is stored in the stream file, and the predetermined restriction is an upper limit of time with which the information which represents the time is capable of being represented.

6. In the recording apparatus as set forth in claim 1, characterized in that the control section controls the recording section to set information which denotes that the stream file and a stream file preceded thereby are continuously reproduced at frame timings to the reproduction region data which represents the recorded stream file as a reproduction region and record the reproduction region data to the record medium.

7. In a recording method of multiplexing video data and audio data and recording the resultant data to a record medium, characterized in that the recording method comprises:

a record command input step at which a record start command and a record stop command for the video data and the audio data that have been input from a data input;

a recording step of multiplexing the video data and the audio data in a unit of a packet and successively recording a multiplexed stream to a stream file on the record medium in the unit of the packet;

a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command to the record command input step, and when information which represents an attribute of the stream file does not satisfy a predetermined restriction with a predetermined unit composed of one or a plurality of the packets recorded to the stream file, the control step is performed by controlling the recording step to close the stream file, newly create the stream file, and successively record the stream to the new stream file starting from the predetermined unit, and based on the record stop command at the record command input step, the control step is performed by controlling the recording section such that reproduction time of beginning of the video data of the stream file matches reproduction time of beginning of the audio data of the stream file and reproduction time of last end of the audio data is later than reproduction time of last end of the video data.

8. A non-transitory storage medium on which is recorded a recording program which causes a computer apparatus to execute a recording method of multiplexing video data and audio data and recording the resultant data to a record medium, characterized in that the recording method comprises:

a record command input step at which a record start command and a record stop command for the video data and the audio data that have been input from a data input;

a recording step of multiplexing the video data and the audio data in a unit of a packet and successively recording a multiplexed stream to a stream file on the record medium in the unit of the packet;

a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command to the record command input step, and when information which represents an attribute of the stream file does not satisfy a predetermined restriction with a predetermined unit composed of one or a plurality of the packets recorded to the stream file, the control step is performed by controlling the recording step to close the stream file, newly create the stream file, and successively record the stream to the new stream file starting from the predetermined unit, and based on the record stop command, the control step is controlled by controlling recording step such that reproduction time of beginning of the video data of the stream file matches reproduction time of beginning of the audio data of the stream file and reproduction time of last end of the audio data is later than reproduction time of last end of the video data.

9. In an image capturing apparatus which multiplexes video data of which a subject has been captured and obtained by an image capturing section and audio data of which a sound has been collected and obtained by a sound collecting section and records resultant data to a record medium, characterized in that the image capturing apparatus comprises:

the image capturing section which captures the subject and outputs the video data;

the sound collecting section which collects the sound and outputs the audio data;

a recording section which multiplexes the video data and the audio data in a unit of a packet and successively records a multiplexed stream to a stream file on the record medium in the unit of the packet;

an operation section which accepts user's operations for a record start command and a record stop command for the video data and the audio data to the record medium;

a management information creating section which creates a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control section including a central processing unit which controls the recording section and the management information creating section, the control section controls the recording section to start and stop recording of the stream to the stream file according to the record start command and the record stop command by the operations, and when information which represents an attribute of the stream file does not satisfy a predetermined restriction with a predetermined unit composed of one or a plurality of the packets recorded to the stream file, the control section controls the recording section to close the stream file, newly create the stream file, and successively record the stream to the new stream file starting from the predetermined unit, and based on the record stop command, the control section controls the recording section such that reproduction time of beginning of the video data of the stream file matches reproduction time of beginning of audio data of the stream file and reproduction time of last end of the audio data is later than reproduction time of last end of the video data.

10. In the image capturing apparatus as set forth in claim 9, characterized in that the control section controls recording of the recording section such that time of last end of the audio data recorded to the stream file which is closed based on the predetermined restriction matches time of beginning of the audio data stored in the new stream file, and the control section controls the recording section to set information which denotes that the video data and the audio data recorded in the closed stream file and the video data and the audio data recorded in the new stream file are continuously reproduced in reproduction region data which represents the closed stream file as a reproduction region and record the reproduction region data to the record medium.

11. In the image capturing apparatus as set forth in claim 9, characterized in that the attribute of the stream file is a file size, and the predetermined restriction is an upper limit of the file size.

12. In the image capturing apparatus as set forth in claim 9, characterized in that the attribute of the stream file is entry point information which is stored in the stream information file and which associates information which represents time of the video data stored in the stream file with an address in the stream file, and the predetermined restriction is an upper limit of records of the entry point information which is capable of being stored in the stream information file.

13. In the image capturing apparatus as set forth in claim 9, characterized in that the attribute of the stream file is information which represents time at which the video data is stored in the stream file, and the predetermined restriction is an upper limit of time with which the information which represents the time is capable of being represented.

14. In the image capturing apparatus as set forth in claim 9, characterized in that the control section controls the recording section to set information which denotes that the stream file and a stream file preceded thereby are continuously reproduced at frame timings to the reproduction region data which represents the recorded stream file as a reproduction region and record the reproduction region data to the record medium.

15. In an image capturing method of multiplexing video data of which a subject has been captured and obtained by an image capturing section and audio data of which a sound has been collected and obtained by a sound collecting section and recording resultant data to a record medium, characterized in that the image capturing method comprises:

a recording step of multiplexing the video data of which the subject has been captured and obtained and the audio data of which the sound has been collected and obtained in a unit of a packet and successively recording a multiplexed stream to a stream file on the record medium in the unit of the packet;

a step of accepting user's operations for a record start command and a record stop command against an operation section for the video data and the audio data to the record medium;

a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command by the operations to the operation section, and when information which represents an attribute of the stream file does not satisfy a predetermined restriction with a predetermined unit composed of one or a plurality of the packets recorded to the stream file, the control step is performed by controlling the recording step to close the stream file, newly creating the stream file, and successively recording the stream to the new stream file starting from the predetermined unit, and based on the record stop command, the control step is performed by controlling the recording step such that reproduction time of beginning of the video data of the stream file matches reproduction time of beginning of the audio data of the stream file and reproduction time of last end of the audio data is later than reproduction time of last end of the video data.

16. A non-transitory storage medium on which is recorded an image capturing program which causes a computer apparatus to execute an image capturing method of multiplexing video data of which a subject has been captured and obtained by an image capturing section and audio data of which a sound has been collected and obtained by a sound collecting section and recording resultant data to a record medium, characterized in that the image capturing method comprises:

a recording step of multiplexing the video data of which the subject has been captured and obtained and the audio data of which the sound has been collected and obtained in a unit of a packet and successively recording a multiplexed stream to a stream file on the record medium in the unit of the packet;

a step of accepting user's operations for a record start command and a record stop command against an operation section for the video data and the audio data to the record medium;

a management information creating step of creating a stream information file which associates at least reproduction time information of the stream file recorded on the record medium with address information thereof and a reproduction list file which stores at least one record of reproduction region data which represents a reproduction region which is set with a reproduction start point and a reproduction end point of the stream file, the reproduction list file being capable of storing mark information which represents reproduction time information of the stream file; and a control step of controlling the recording step and the management information creating step, the control step is performed by controlling the recording step to start and stop recording of the stream to the stream file according to the record start command and the record stop command by the operations to the operation section, and when information which represents an attribute of the stream file does not satisfy a predetermined restriction with a predetermined unit composed of one or a plurality of the packets recorded in the stream file, the control step is performed by controlling the recording step to close the stream file, newly creating the stream file, and successively recording the stream to the new stream file starting from the predetermined unit, and based on the record stop command, the control step is performed by controlling the recording step such that reproduction time of beginning of the video data of the stream file matches reproduction time of beginning of the audio data of the stream file and reproduction time of last end of the audio data is later than reproduction time of last end of the video data.

\* \* \* \* \*